(12) United States Patent
Rungta et al.

(10) Patent No.: US 11,503,489 B2
(45) Date of Patent: Nov. 15, 2022

(54) CHANNEL MEASUREMENT TECHNIQUES IN DISCONTINUOUS RECEPTION SCENARIOS

(71) Applicant: QUALCOMM Incorporated, San Diego, CA (US)

(72) Inventors: Pranay Sudeep Rungta, San Diego, CA (US); Shailesh Maheshwari, San Diego, CA (US); Sanjana Vijaykumar Kalyanappagol, San Diego, CA (US); Ankit Verma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 17/024,198

(22) Filed: Sep. 17, 2020

(65) Prior Publication Data
US 2021/0084516 A1 Mar. 18, 2021

Related U.S. Application Data

(60) Provisional application No. 62/901,954, filed on Sep. 18, 2019.

(51) Int. Cl.
*H04W 76/28* (2018.01)
*H04W 24/10* (2009.01)
(Continued)

(52) U.S. Cl.
CPC .......... *H04W 24/10* (2013.01); *H04B 7/0626* (2013.01); *H04B 7/0632* (2013.01);
(Continued)

(58) Field of Classification Search
CPC ... H04W 24/10; H04W 72/042; H04W 76/28; H04W 52/0216; H04W 52/0229;
(Continued)

(56) References Cited

U.S. PATENT DOCUMENTS

2017/0251518 A1  8/2017 Agiwal et al.
2018/0213482 A1* 7/2018 Dortmund ........... H04W 64/006
(Continued)

FOREIGN PATENT DOCUMENTS

EP   2696630 A1   2/2014
WO   WO-2015036173 A1   3/2015

OTHER PUBLICATIONS

International Search Report and Written Opinion—PCT/US2020/051555—ISA/EPO—dated Nov. 18, 2020.

*Primary Examiner* — Hoon J Chung
(74) *Attorney, Agent, or Firm* — Holland and Hart

(57) ABSTRACT

Methods, systems, and devices for wireless communications are described for configuring a user equipment (UE) for reference signal measurement while operating according to a discontinuous reception (DRX) configuration. The DRX configuration may include periodic DRX ON-durations, during which the UE is to be in an active mode for reception and transmission of signals, and between which the UE may transition to a low-power inactive mode. One or more reference signals may be scheduled for transmission by the base station during periods in which the UE may be in the inactive mode, and the UE may skip monitoring one or more of the reference signals while in the inactive mode. For one or more reference signal occasions, the UE may determine, based at least in part on a change in a channel quality metric, to be in a limited active mode in order to measure the reference signal.

30 Claims, 14 Drawing Sheets

(51) Int. Cl.
  *H04B 17/318* (2015.01)
  *H04B 7/06* (2006.01)
  *H04W 72/04* (2009.01)
  *H04L 5/00* (2006.01)
  *H04B 17/336* (2015.01)

(52) U.S. Cl.
  CPC ......... *H04B 17/318* (2015.01); *H04B 17/336* (2015.01); *H04L 5/0051* (2013.01); *H04W 72/042* (2013.01); *H04W 76/28* (2018.02)

(58) Field of Classification Search
  CPC . H04W 52/028; H04B 7/0626; H04B 7/0632; H04B 17/318; H04B 17/336; H04L 1/20; H04L 5/001; H04L 5/0026; H04L 5/0048; H04L 5/0051; H04L 5/0082; H04L 5/0092; H04L 5/14; H04L 25/0224; H04L 27/2601; Y02D 30/70
  See application file for complete search history.

(56) References Cited

U.S. PATENT DOCUMENTS

2019/0059129 A1   2/2019  Luo et al.
2020/0280393 A1*  9/2020  Qu ........................ H04L 1/0038

* cited by examiner

CHANNEL MEASUREMENT TECHNIQUES IN DISCONTINUOUS RECEPTION SCENARIOS

CROSS REFERENCE

The present application for patent claims the benefit of U.S. Provisional Patent Application No. 62/901,954 by RUNGTA et al., entitled "CHANNEL MEASUREMENT TECHNIQUES IN DISCONTINUOUS RECEPTION SCENARIOS," filed Sep. 18, 2019, assigned to the assignee hereof, and expressly incorporated by reference herein.

BACKGROUND

The following relates generally to wireless communications, and more specifically to channel measurement techniques in discontinuous reception scenarios.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Some wireless communications systems may support UEs operating in a discontinuous reception (DRX) mode. UEs in a DRX mode may transition between a sleep or inactive state for power conservation and an ON or active state for data transmission and reception (during an ON-duration) according to a DRX configuration.

SUMMARY

The described techniques relate to improved methods, systems, devices, and apparatuses that support channel measurement techniques in discontinuous reception (DRX) scenarios. In accordance with various aspects, techniques are provided for configuring a user equipment (UE) to be in an active DRX mode outside of one or more scheduled active DRX modes of a DRX configuration, during which the UE can measure one or more reference signal transmissions of a base station. In some cases, the DRX configuration may include periodic DRX ON-durations, during which the UE is to be in an active mode for reception and transmission of signals, and between which the UE may transition to a low-power inactive mode. When referring to active mode based on timings of a DRX configuration, reference is made to such network configured active modes, which are referred to herein as "active mode" or "DRX active" states. In some cases, one or more reference signals may be scheduled for transmission by the base station during periods in which the UE may be in an inactive mode. In some aspects of the present disclosure, the UE may skip monitoring one or more of the reference signals in order to be in an inactive mode and conserve power. In such cases, the UE may in some instances determine to be in a limited active mode or UE-initiated active mode (referred to as "limited active mode" herein) in order to measure a reference signal based at least in part on a change in a channel quality metric (e.g., a reference signal received power (RSRP) or a reference signal received quality (RSRQ) metric). Such a limited active mode may have fewer components powered relative to the network configured active mode, as discussed in further detail below. For example, if two consecutive measurements of the channel quality metric exceed a threshold value during a predetermined period before a reference signal transmission that is scheduled in a DRX inactive period, the UE may be set to be in the limited active mode to perform a channel measurement of the reference signal transmission.

In some cases, the UE may extend the duration of an ON-duration of the DRX cycle before or after the scheduled ON-duration in order to be in the limited active mode for the reference signal transmission. In other cases, the UE may transition to the inactive mode, transition to the limited active mode for the reference signal measurement, and then transition back to the inactive mode until the start of the next scheduled active mode of the DRX configuration. In some cases, the UE may determine whether to extend an ON-duration or wake up from an inactive mode to the limited active mode based at least in part on an amount of time between a start or end of a scheduled ON-duration and the scheduled reference signal transmission. In some cases, when the UE is set to be in the limited active mode, the UE may power down or deactivate components associated with channel decoding (e.g., physical downlink control channel (PDCCH) decoding) while activating components to receive the reference signal transmission. For example, in some cases the UE may turn on a front end of a receive chain to capture samples of the reference signal and turn off baseband decoding components of the receive chain. Such a limited active mode may thus provide power to components associated with reference signal measurements, but allow other components to be deactivated in order to provide reduced power consumption during such measurements relative to power consumption during a scheduled ON-duration in which channel decoding components are active.

A method of wireless communications at a UE is described. The method may include receiving a discontinuous reception cycle configuration from a base station that indicates a set of discontinuous reception cycles within a discontinuous reception period that each have an ON-duration during which the UE is to be in an active mode to monitor for transmissions from the base station, and where the UE transitions to an inactive mode after one or more of the ON-durations until a subsequent ON-duration, identifying a channel measurement schedule that indicates a timing for one or more channel measurements of the UE, where at least a first channel measurement occurs when the UE is to be in the inactive mode of the discontinuous reception cycle configuration, determining that a change in a channel quality metric exceeds a threshold value during a predetermined period before the first channel measurement, and setting the UE to be in a limited active mode to perform the first scheduled channel measurement based on the determining that the change in the channel quality metric exceeds the threshold value for at least the predetermined period before the first channel measurement.

An apparatus for wireless communications at a UE is described. The apparatus may include a processor, memory coupled with the processor, and instructions stored in the memory. The instructions may be executable by the processor to cause the apparatus to receive a discontinuous reception cycle configuration from a base station that indicates a set of discontinuous reception cycles within a discontinuous reception period that each have an ON-duration during which the UE is to be in an active mode to monitor for transmissions from the base station, and where the UE transitions to an inactive mode after one or more of the ON-durations until a subsequent ON-duration, identify a channel measurement schedule that indicates a timing for one or more channel measurements of the UE, where at least a first channel measurement occurs when the UE is to be in the inactive mode of the discontinuous reception cycle configuration, determine that a change in a channel quality metric exceeds a threshold value during a predetermined period before the first channel measurement, and set the UE to be in a limited active mode to perform the first scheduled channel measurement based on the determining that the change in the channel quality metric exceeds the threshold value for at least the predetermined period before the first channel measurement.

Another apparatus for wireless communications at a UE is described. The apparatus may include means for receiving a discontinuous reception cycle configuration from a base station that indicates a set of discontinuous reception cycles within a discontinuous reception period that each have an ON-duration during which the UE is to be in an active mode to monitor for transmissions from the base station, and where the UE transitions to an inactive mode after one or more of the ON-durations until a subsequent ON-duration, identifying a channel measurement schedule that indicates a timing for one or more channel measurements of the UE, where at least a first channel measurement occurs when the UE is to be in the inactive mode of the discontinuous reception cycle configuration, determining that a change in a channel quality metric exceeds a threshold value during a predetermined period before the first channel measurement, and setting the UE to be in a limited active mode to perform the first scheduled channel measurement based on the determining that the change in the channel quality metric exceeds the threshold value for at least the predetermined period before the first channel measurement.

A non-transitory computer-readable medium storing code for wireless communications at a UE is described. The code may include instructions executable by a processor to receive a discontinuous reception cycle configuration from a base station that indicates a set of discontinuous reception cycles within a discontinuous reception period that each have an ON-duration during which the UE is to be in an active mode to monitor for transmissions from the base station, and where the UE transitions to an inactive mode after one or more of the ON-durations until a subsequent ON-duration, identify a channel measurement schedule that indicates a timing for one or more channel measurements of the UE, where at least a first channel measurement occurs when the UE is to be in the inactive mode of the discontinuous reception cycle configuration, determine that a change in a channel quality metric exceeds a threshold value during a predetermined period before the first channel measurement, and set the UE to be in a limited active mode to perform the first scheduled channel measurement based on the determining that the change in the channel quality metric exceeds the threshold value for at least the predetermined period before the first channel measurement.

Some examples of the method, apparatuses, and non-transitory computer-readable medium described herein may further include operations, features, means, or instructions for skipping at least one prior channel measurement prior to the first channel measurement based on the UE being in the inactive mode of the discontinuous reception cycle at a corresponding time of the at least one prior channel measurement, and where the predetermined period corresponds to a predetermined number of skipped prior channel measurements. Some examples of the method, apparatuses, and non-transitory computer-readable medium described herein may further include operations, features, means, or instructions for updating a counter of skipped channel measurements upon each occurrence of skipping a channel measurement, and comparing a value of the counter to the predetermined number of skipped prior channel measurements to determine to maintain the UE in the limited active mode to perform the first scheduled channel measurement. In some examples of the method, apparatuses, and non-transitory computer-readable medium described herein, the counter of skipped channel measurements may be updated when the UE transitions from the inactive mode to the active mode of the discontinuous reception cycle. Some examples of the method, apparatuses, and non-transitory computer-readable medium described herein may further include operations, features, means, or instructions for performing the first scheduled channel measurement, and resetting the counter of skipped channel measurements to an initial value responsive to the performing the first scheduled channel measurement.

In some examples of the method, apparatuses, and non-transitory computer-readable medium described herein, the predetermined period may be based on a preconfigured time duration. In some examples of the method, apparatuses, and non-transitory computer-readable medium described herein, a duration of the predetermined period may be based on a magnitude of the change in the channel quality metric. In some examples of the method, apparatuses, and non-transitory computer-readable medium described herein, a duration of the predetermined period may be longer for a smaller magnitude of change in the channel quality metric, and may be shorter for a larger magnitude of change in the channel quality metric. In some examples of the method, apparatuses, and non-transitory computer-readable medium described herein, the channel quality metric includes one or more of a reference signal received power (RSRP), a reference signal received quality (RSRQ), or a signal to noise ratio (SNR), or any combinations thereof, that may be determined based on one or more signals received from the base station.

In some examples of the method, apparatuses, and non-transitory computer-readable medium described herein, the determining that the change in the channel quality metric exceeds the threshold value may include operations, features, means, or instructions for comparing a current value of the channel quality metric to a prior value of the channel quality metric prior to transitioning to the inactive mode. In some examples of the method, apparatuses, and non-transitory computer-readable medium described herein, the determining that the change in the channel quality metric exceeds the threshold value further may include operations, features, means, or instructions for storing, after the comparing, the current value of the channel quality metric to replace the prior value of the channel quality metric.

In some examples of the method, apparatuses, and non-transitory computer-readable medium described herein, the determining that the change in the channel quality metric exceeds the threshold value during the predetermined period before the first channel measurement further may include operations, features, means, or instructions for determining that at least a predetermined number of prior channel measurements may have been skipped based on the UE being in the inactive mode during corresponding scheduled channel measurements of the channel measurement schedule, where the predetermined period corresponds to the predetermined number of prior channel measurements, and determining that a difference between a current channel quality metric and a prior channel quality metric exceeds the threshold value.

In some examples of the method, apparatuses, and non-transitory computer-readable medium described herein, the setting the UE to be in the limited active mode further may include operations, features, means, or instructions for maintaining channel measurement components of the UE in an ON state and deactivating PDCCH decoding components following an ON-duration of the discontinuous reception cycle that may be prior to the first channel measurement, performing the first channel measurement, and deactivating, responsive to performing the first channel measurement, the channel measurement components. In some examples of the method, apparatuses, and non-transitory computer-readable medium described herein, the channel measurement components may be maintained in the ON state after expiration of the ON-duration based on the scheduled CSI measurement being within a predetermined time from the expiration of the ON-duration.

In some examples of the method, apparatuses, and non-transitory computer-readable medium described herein, the setting the UE to be in the limited active mode further may include operations, features, means, or instructions for transitioning channel measurement components and PDCCH decoding components of the UE to an inactive state following an ON-duration of the discontinuous reception cycle that may be prior to the first channel measurement, transitioning the channel measurement components to an ON state based on the channel measurement schedule associated with the first channel measurement, performing the first channel measurement, and deactivating, responsive to performing the first channel measurement, the channel measurement components. In some examples of the method, apparatuses, and non-transitory computer-readable medium described herein, the channel measurement components may be transitioned to the ON state after expiration of the ON-duration based on the scheduled CSI measurement being between a predetermined time from the expiration of the ON-duration and from a start of a subsequent ON-duration.

In some examples of the method, apparatuses, and non-transitory computer-readable medium described herein, the setting the UE to be in the limited active mode further may include operations, features, means, or instructions for transitioning channel measurement components and PDCCH decoding components of the UE to an inactive state following an ON-duration of the discontinuous reception cycle that may be prior to the first channel measurement, transitioning the channel measurement components to an ON state based on the channel measurement schedule associated with the first channel measurement, performing the first channel measurement, and transitioning the PDCCH decoding components to the ON state for a subsequent ON-duration. In some examples of the method, apparatuses, and non-transitory computer-readable medium described herein, the channel measurement components may be transitioned to the ON state prior to the subsequent ON-duration based on the scheduled CSI measurement being within a predetermined time from a start of the subsequent ON-duration.

DETAILED DESCRIPTION

Figure 1:
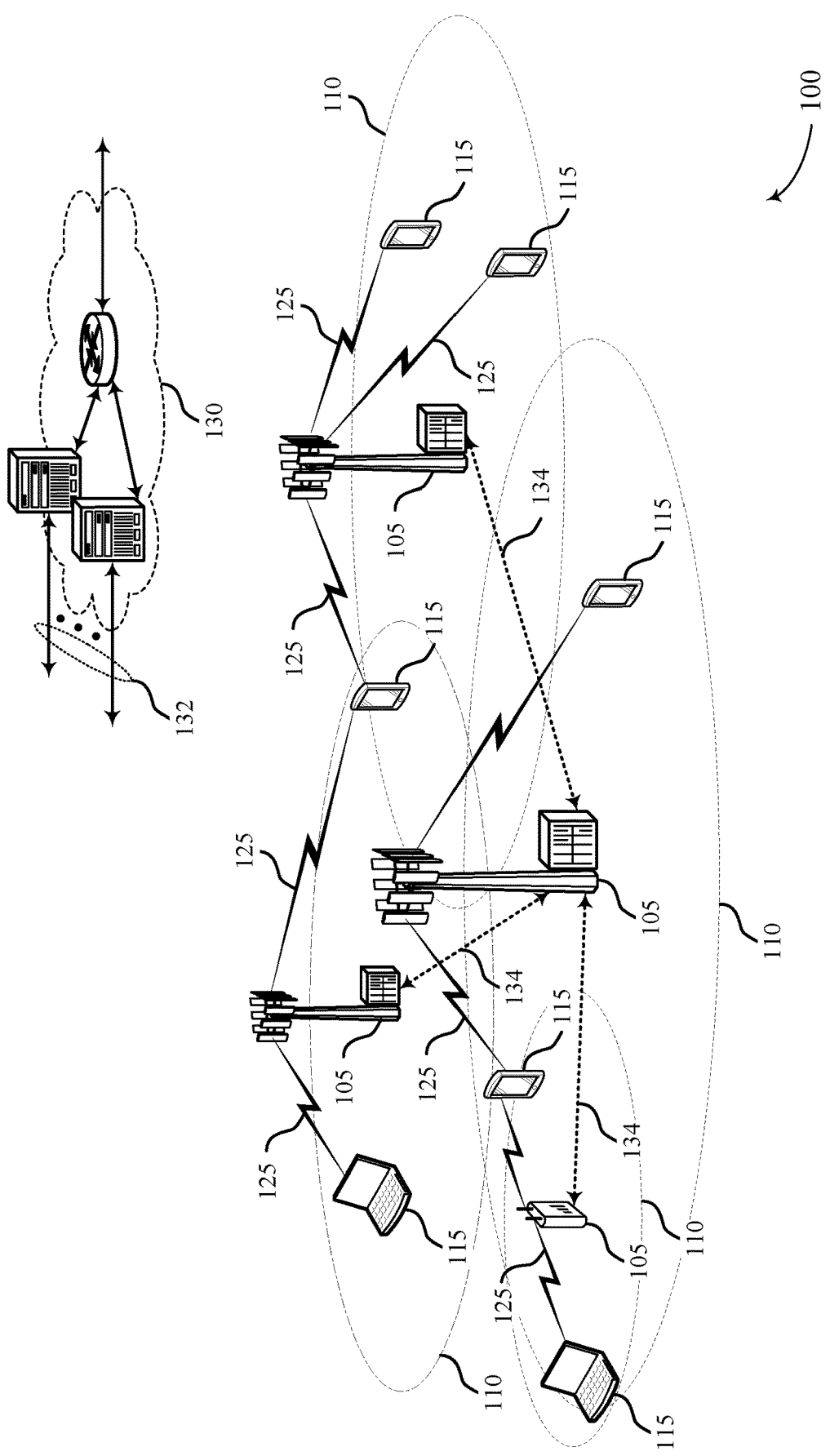
FIG. 1 illustrates an example of a system for wireless communications that supports channel measurement techniques in discontinuous reception scenarios in accordance with aspects of the present disclosure.

Some wireless communications systems may have transmissions between a user equipment (UE) and a base station that are performed according to a discontinuous reception (DRX) configuration (e.g., a connected mode DRX (CDRX) configuration) in which the UE transitions to a power-saving inactive state between ON-durations in which the UE is in an active mode to monitor for communications from the base station or transmit communications to the base station. In some cases, a DRX configuration may result in the UE having an inactive state during periods in which the base station may transmit one or more reference signals (e.g., channel state information reference signals (CSI-RSs)) for use in channel measurements at the UE. In such cases, if the UE remains in the inactive state, channel measurements of the UE may become stale resulting in a lower likelihood of successful communications between the UE and the base station. Further, if the UE were to maintain an active mode in order to receive and measure such reference signals, power consumption is increased. Various aspects of the present disclosure provide techniques for UE measurements of reference signals that are transmitted during a scheduled DRX inactive state of a UE.

In some aspects of the present disclosure, the UE may skip monitoring one or more of the reference signals that are transmitted during one or more scheduled DRX inactive states, in order to be in an inactive mode and conserve power. In such cases, during DRX ON-durations, the UE may determine one or more channel quality metrics (e.g., a reference signal received power (RSRP), a reference signal received quality (RSRQ) metric, a signal to interference and noise ratio (SINR) metric, etc.) of signals received from the base station. The UE, based on the one or more channel quality metrics, may determine that a subsequent reference signal (e.g., a CSI-RS) transmission is to be measured in order to allow for transmission parameters to be set based on relatively current channel conditions as measured at the UE.

For example, a DRX configuration may result in the UE having a scheduled DRX inactive state during which the base station may transmit periodic CSI-RSs. The UE, based on the DRX configuration, may skip monitoring of one or more CSI-RSs, and turn on receive components for scheduled DRX ON-durations during which UE may monitor for transmissions from the base station. The base station, based on the DRX configuration, may transmit one or more downlink communications to the UE during the DRX ON-durations, where the downlink communications may include a demodulation reference signal (DMRS) for use by the UE in demodulating the downlink transmissions. The UE may measure the one or more channel quality metrics, and compare a current channel quality metric to a prior channel quality metric. In some cases, if the change in the one or more channel quality metrics exceeds a threshold, the UE may determine to be in the limited active mode for a subsequent CSI-RS transmission. The UE may then measure channel state information based on the subsequent CSI-RS transmissions, and provide a channel state feedback report to the base station that may be used to set transmission parameters for subsequent communications between the UE and base station.

Additionally or alternatively, the UE may maintain a counter of skipped reference signal measurements, and may determine to be in the limited active mode for a subsequent CSI-RS transmission based on a state of the counter. For example, if the UE has skipped more than a threshold number of reference signal measurements, and the change in the one or more channel quality metrics exceeds a threshold value, the UE may determine to be in the limited active mode for a subsequent CSI-RS transmission. In some cases, the threshold value for the change in channel quality metrics may be dependent upon the value of the counter of skipped reference signal measurements. For example, the threshold value for the change in channel quality metrics may be lowered as more reference signal measurements are skipped. Further, in some cases if the change in channel quality metrics exceeds an upper limit, the UE be in the limited active mode to measure a next CSI-RS irrespective of the value of the counter. After performing a CSI-RS measurement, the UE may reset the counter of skipped reference signal measurements back to an initial value (e.g., zero).

In some cases, the UE may extend the duration of an ON-duration of the DRX cycle before or after the scheduled ON-duration in order to be in the limited active mode for the reference signal transmission. In other cases, the UE may transition to the inactive mode, transition to the limited active mode for the reference signal measurement, and then transition back to the inactive mode until the start of the next scheduled active mode of the DRX configuration. In some cases, the UE may determine whether to extend an ON-duration or wake up from an inactive mode to the limited active mode based at least in part on an amount of time between a start or end of a scheduled ON-duration and the scheduled reference signal transmission. In some cases, when the UE is set to be in the limited active mode, the UE may power down components associated with channel decoding (e.g., physical downlink control channel (PDCCH) decoding or a baseband decoding component), and provide power to components associated with reference signal measurements, in order to provide reduced power consumption during such measurements relative to power consumption during a regular active mode of a scheduled ON-duration in which channel decoding components are active.

Such techniques may allow for relatively efficient communications between the UE and base station while providing relatively low power consumption at the UE. By skipping measurements of reference signals, the UE may reduce power consumption. Further, by maintaining the limited active mode for reference signal measurements only when channel conditions have had a significant change, channel state information may be provided in order to allow for transmission parameters (e.g., modulation and coding scheme (MCS), transmission power, etc.) that are based on more up-to-date channel information. Thus, techniques as discussed herein provide for reduced power consumption while providing for reliable communications based on channel conditions.

Aspects of the disclosure are initially described in the context of a wireless communications system. Examples of DRX configurations and additional limited active mode durations for reference signal measurements are then discussed for various examples. Aspects of the disclosure are further illustrated by and described with reference to apparatus diagrams, system diagrams, and flowcharts that relate to channel measurement techniques in discontinuous reception scenarios.

FIG. 1 illustrates an example of a wireless communications system 100 that supports channel measurement techniques in discontinuous reception scenarios in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, one or more UEs 115 may be configured with DRX cycles, and a serving base station 105 may have a CSI-RS configuration that provides periodic transmissions of CSI-RS. As the DRX configuration and CSI-RS configuration may be established independently of each other, in some cases CSI-RS transmissions may occur in periods during which the UE 115 is to be in an inactive DRX mode during the CSI-RS transmissions. The UE 115, in some cases, may skip monitoring of the CSI-RS unless a channel metric (e.g., RSRP or RSRQ) changes by more than a threshold amount. In some cases, the UE 115 may maintain a counter of skipped CSI-RS measurements, and may be set to be in a limited active mode during a CSI-RS transmission if the counter exceeds a predetermined count value and the channel metric exceeds the threshold.

Figure 2:
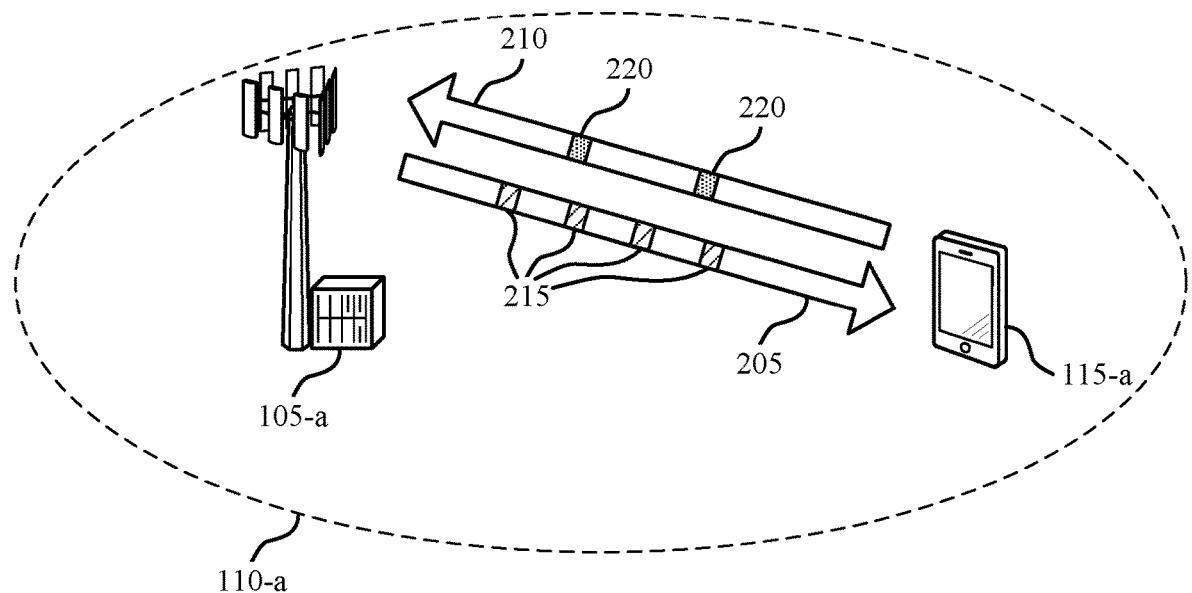
FIG. 2 illustrates an example of a portion of a wireless communications system that supports channel measurement techniques in discontinuous reception scenarios in accordance with aspects of the present disclosure.

FIG. 2 illustrates an example of a wireless communications system 200 that supports channel measurement techniques in discontinuous reception scenarios in accordance with aspects of the present disclosure. In some examples, wireless communications system 200 may implement aspects of wireless communications system 100. For example, the wireless communications system 200 may include a base station 105-a and a UE 115-a, which may be examples of the corresponding devices described with reference to FIG. 1. Some examples of the wireless communications system 200 may support CSI measurement techniques with DRX configurations as discussed herein.

The base station 105-a may provide a network coverage for UE 115-a within geographic coverage area 110-a. In some examples, UE 115-a may support DRX operation for improved power efficiency. For example, a UE 115-a may operate according to a DRX configuration in which the UE 115-a monitors for communications during periodic ON-durations, and transitions to a low power inactive mode between the periodic ON-durations during which the UE 115-a is in an active mode. The time period between the start of each ON-duration may be referred to as a cycle duration. Further, in some cases, DRX cycles may have an identified starting location (e.g., at the start of an identified slot within a subframe), and a configurable ON-duration (e.g., 2 slots) that starts at an offset (e.g., 4 slots) relative to the identified starting location.

Figure 3:
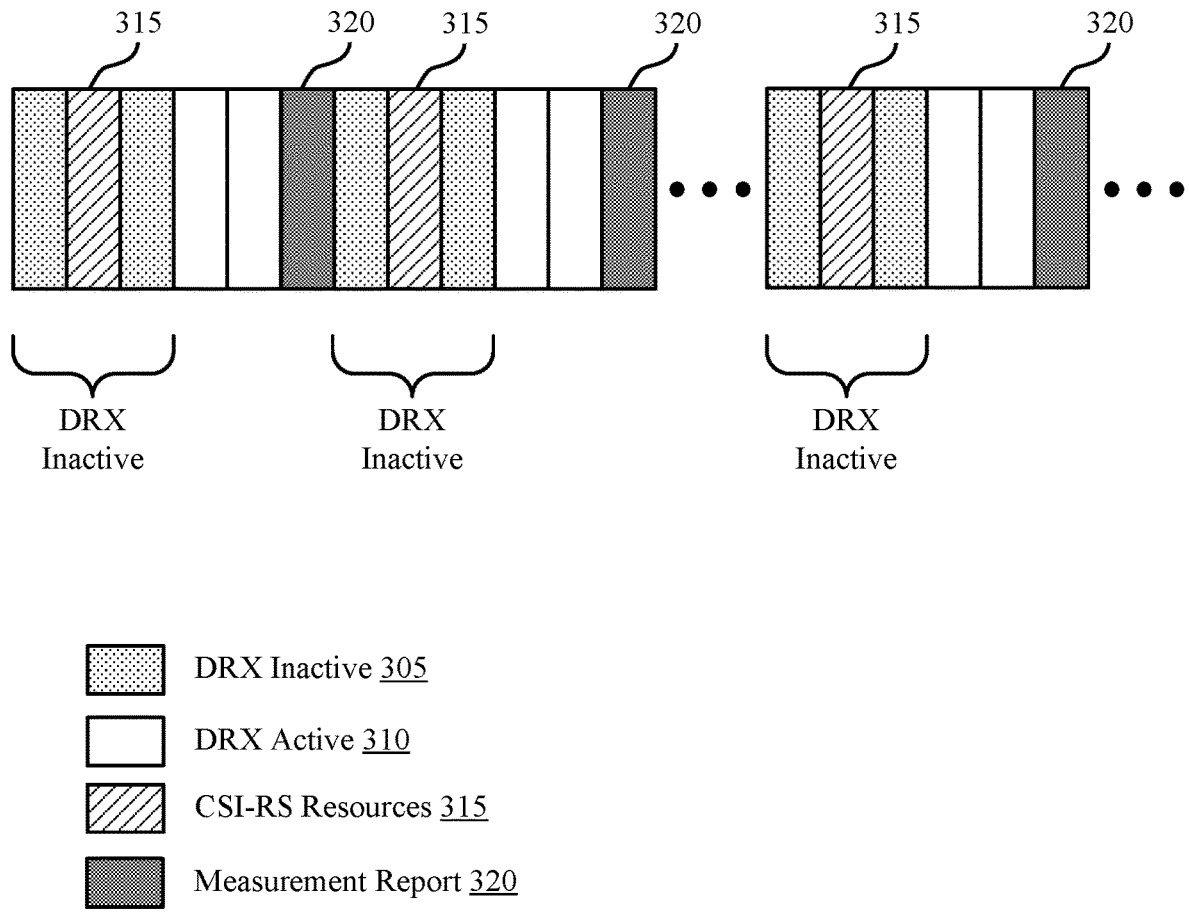
FIG. 3 illustrates an example of a DRX cycle and CSI-RS cycle that supports channel measurement techniques in discontinuous reception scenarios in accordance with aspects of the present disclosure.
Figure 4:
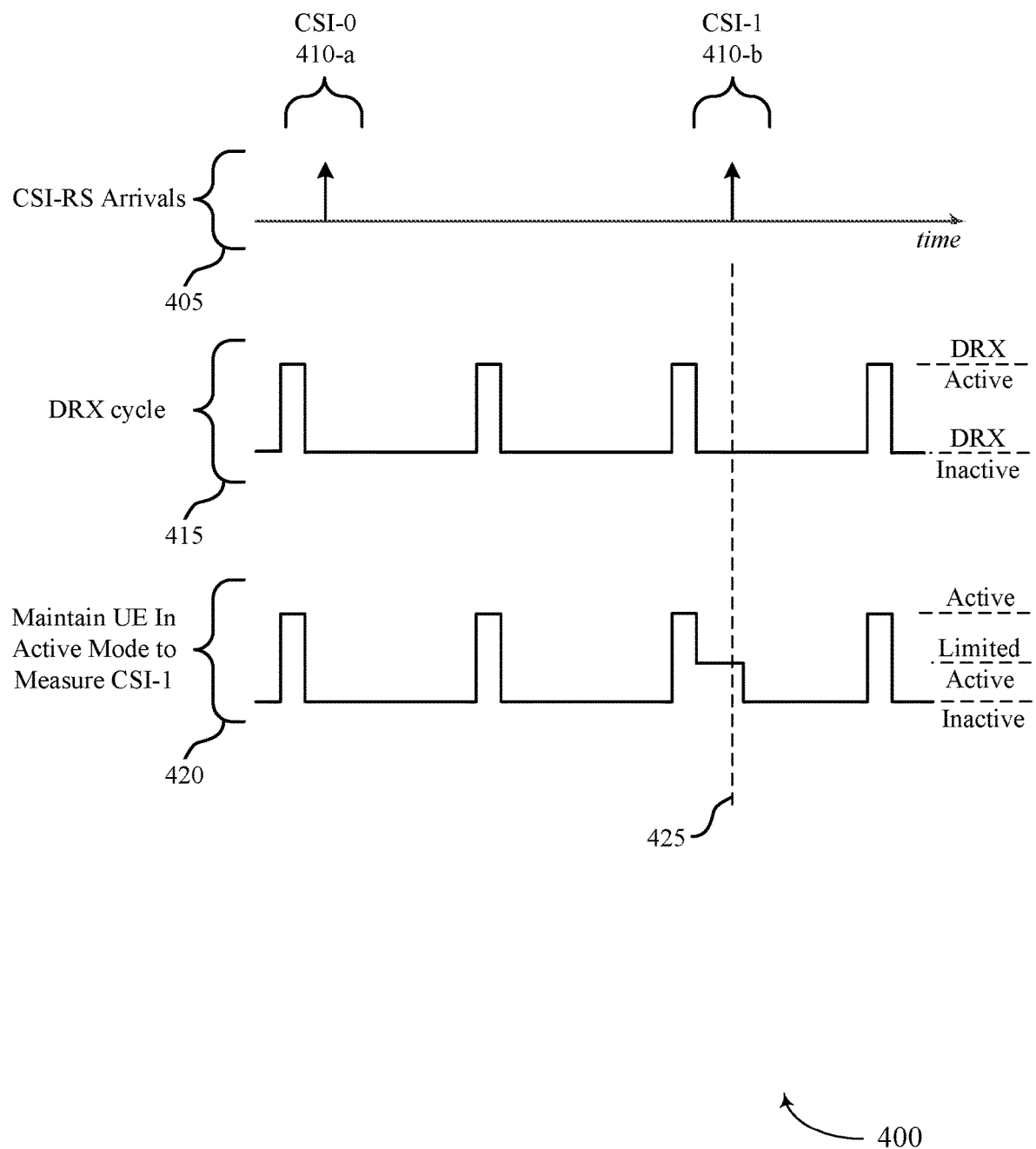
FIGS. 4 through 6 illustrate examples of DRX cycles with limited active mode portions that support channel measurement techniques in discontinuous reception scenarios in accordance with aspects of the present disclosure.
Figure 5:
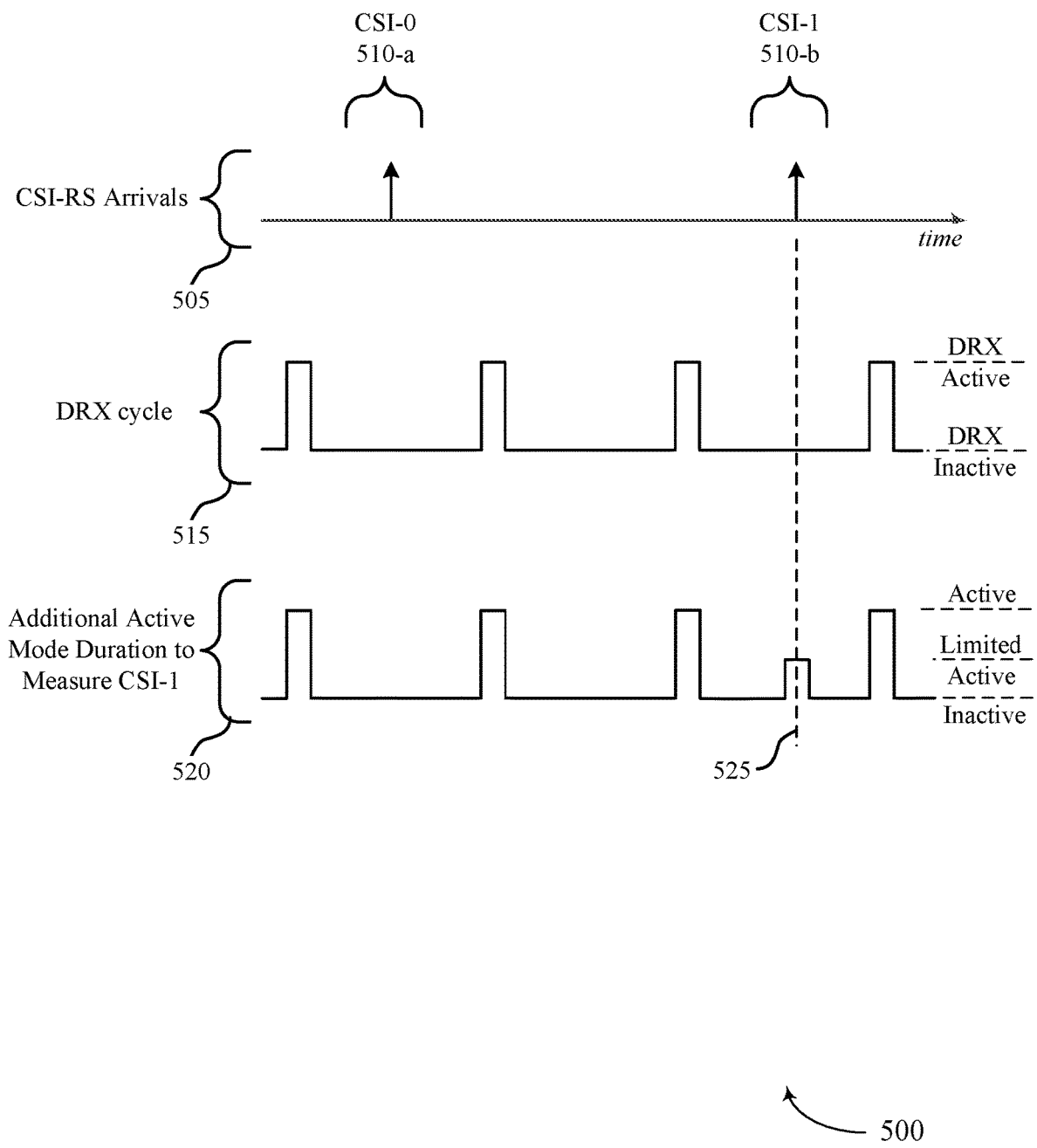
Figure 6:
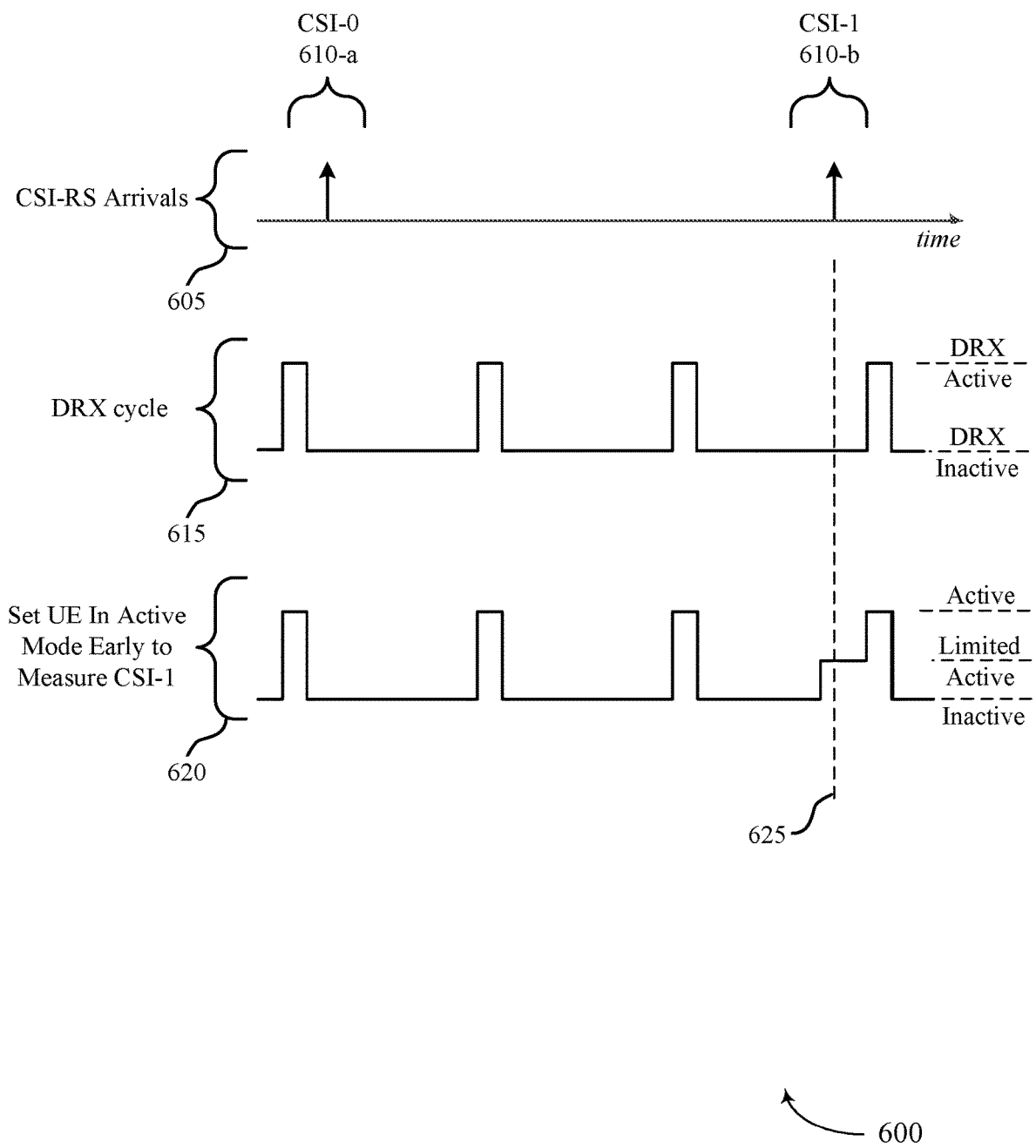

For example, the base station 105-a and UE 115-a may establish one or more downlink channels 205 and one or more uplink channels 210. In this example, the base station 105-a may configure CSI-RS transmissions 215 that may be transmitted according to a schedule that is provided by the base station 105-a. The UE 115-a may monitor for the CSI-RS transmissions 215 and perform channel measurements based on the CSI-RSs that are received at the UE 115-a. The UE 115-a may format the channel measurements into channel state feedback reports 220 (e.g., CSI reports) that are transmitted to the base station 105-a according to a CSI reporting configuration (e.g., periodic, semi-persistent, or aperiodic reporting). The base station 105-a may use information from the channel state feedback reports 220 to determine transmission parameters for communications with the UE 115-a (e.g., a MCS, transmit power, etc.). As discussed herein, in some cases the schedule for CSI-RS transmissions 215 may result in CSI-RS transmissions 215 that occur during a scheduled inactive mode of the UE 115-a according to the DRX configuration, and according to techniques provided herein the UE 115-a may be set to be in a limited active mode during one or more CSI-RS transmissions 215. FIG. 3 shows an example of CSI-RSs that may be transmitted during periods where the UE 115-a is in DRX inactive mode, and FIGS. 4 through 6 show several examples of UE 115-a limited active mode timing to provide for CSI-RS 215 measurement.

FIG. 3 illustrates an example of DRX and CSI-RS cycles 300 that support channel measurement techniques in discontinuous reception scenarios in accordance with aspects of the present disclosure. In some examples, DRX and CSI-RS cycles 300 may implement aspects of wireless communications system 100 or 200. In this example, a DRX cycle may have a DRX inactive 305 period, which may also be referred to as a sleep or off duration, and a DRX active 310 period, which may also be referred to as an ON-duration.

In this example, a serving base station (e.g., a base station 105 of FIG. 1 or 2) may configure CSI-RS resources 315. The base station may transmit a CSI-RS using the CSI-RS resources. The CSI-RS resources 315 may occupy, for example, one or more symbols of a slot, and may be used by the base station to transmit a CSI-RS for measurement by one or more UEs. Further, the UE may be configured with measurement report 320 resources that may be used by the UE to transmit a channel state feedback report to the base station. The channel state feedback report, that may be used to determine transmission parameters for subsequent transmissions between the base station and UE.

As can be observed in the example of FIG. 3, each instance of the CSI-RS resources 315 occurs during a DRX inactive mode of the UE. As discussed, CSI-RS transmissions may be used to estimate channel quality, and may be periodic, semi-persistent, or aperiodic in nature. Periodic and semi-persistent CSI-RS resources have their reception occasion fixed upon configuration from the network, where the difference between the two is that periodic CSI-RS are activated upon configuration reception while semi-persistent CSI-RS require a medium access control (MAC) control element (CE) to activate. Aperiodic CSI-RS are triggered by DCI and in general, are not subject to DRX limitations. In some cases, periodic and semi-persistent CSI-RS resources may have their slot periodicity and offset defined by RRC configuration. The channel state feedback may be provided by the UE in measurement report 320 resources, and may be used to transmit the measurement results from CSI-RS to the base station. The base station may use the feedback to adjust scheduling to the UE. For example, if the UE reports a good channel quality then the base station may increase the downlink scheduling while if the UE reports poor channel quality the base station may decrease the rate of downlink scheduling to avoid the costly latencies associated with more likely data retransmissions.

In some deployments, measurement report 320 resources may be periodic, semi-persistent, or aperiodic in nature. Periodic and semi-persistent reports on PUCCH may have their transmission occasions fixed upon configuration from the base station or network, where the difference between the two is that periodic reports are activated upon configuration reception while semi-persistent reports use a MAC- CE to activate. Aperiodic reports may be triggered by DCI. Periodic and semi-persistent measurement reports may have their slot periodicity and offset defined by RRC configuration, for example.

As indicated above, when the UE is operating according to the DRX configuration, it may conserve UE battery power by discontinuously monitoring PDCCH. and turning off hardware components (e.g., one or more receive chains and PDCCH decoding components). Further, when in the DRX inactive state, the UE also is not required to measure CSI-RS transmissions. DRX states, in some cases, are determined by several network configured timers which can be extended dynamically at runtime based on network scheduling. The UE may be considered to be in DRX active mode when any of the RRC configured timers are running, in addition to several asynchronous events such as when scheduling requests are triggered or during portions of the random access procedure. The UE's DRX state may be binary, such that if the UE is not in DRX Active state, then it is in DRX inactive state.

As discussed above, CSI-RS measurements and reporting timelines may be set independently of DRX timelines, and all three timelines may run asynchronously. Because timelines for CSI-RS and DRX may be different, scenarios such as in the example of FIG. 3 may occur, in which periodic CSI-RS resources 315 fall during DRX inactive 305 periods where the UE is not required to measure the reference signal transmissions. Because channel state feedback reports that are transmitted using measurement report 320 resources use measured CSI-RS results, this means that CSI-RS measurements may be stale (e.g., on the order of seconds or more). During this time, especially in mobility scenarios, the UE's channel quality may have changed, and the UE would be unable to inform the network of the updated channel quality.

As discussed herein, various techniques are provided to allow a UE to monitor for CSI-RS when configured to be in a DRX inactive mode during CSI-RS transmission, while also mitigating power impact from measuring the CSI-RS transmissions. In some cases, the UE may maintain a counter of a number of preempted CSI-RS measurements and also maintain a coarse notion of the channel quality through channel quality metrics (e.g., RSRP, RSRQ, SINR). In some cases, upon transitioning from a DRX inactive to a DRX active state, the UE may determine whether there were any CSI-RS occasions that were missed during the DRX inactive period. In some cases, the UE may accumulate the number of missed CSI-RS occasions in a counter $n_{missed\_measurements}$. Upon successfully measuring CSI, this value is reset to zero or some other initial value. Further, prior to transitioning to DRX inactive mode, the UE may check the latest channel quality metrics (e.g., RSRP, RSRQ, SINR) that are measured at the UE, compare the latest value with a previously measured channel quality metric, and compute one or more delta values (e.g., $\Delta_{RSRP}$, $\Delta_{RSRQ}$). The UE may then store the current channel quality metric values (e.g., as $V_{RSRP}$, $V_{RSRQ}$). The UE may then perform a check as follows, and trigger one of the solutions illustrated in FIG. 4, 5, or 6, depending on the estimated time the UE would have to be awake. In one example, the UE may trigger a CSI-RS measurement during a scheduled DRX inactive period if: ($n_{missed\_measurements}$>$thresh_{missed\_measurements}$) AND ($\Delta_{RSRP}$>$thresh_{RSRP}$ OR $\Delta_{RSRQ}$>$thresh_{RSRQ}$), where $thresh_{missed\_measurements}$, $thresh_{RSRP}$, and $thresh_{RSRQ}$ are UE defined thresholds for triggering a CSI-RS measurement while the UE is in DRX inactive mode. In some cases, the thresholds may be predefined for the UE (e.g., based on defined thresholds programmed into a UE modem). In some cases, the thresholds may be configured by a base station or be network configured.

In some cases, if the UE determines to measure CSI-RS while scheduled to be in a DRX inactive mode, the UE will determine an amount of time between the CSI-RS resource and a nearest scheduled DRX active period. FIGS. 4 through 6 illustrate different examples of different locations of the CSI-RS resource within the scheduled DRX inactive mode.

FIG. 4 illustrates an example of a DRX cycle with a limited active mode portion 400 that supports channel measurement techniques in discontinuous reception scenarios in accordance with aspects of the present disclosure. In some examples, DRX cycle with additional limited active mode portions 400 may implement aspects of wireless communications system 100 or 200. In this example, a CSI-RS configuration may provide CSI-RS arrivals 405 at periodic intervals, as indicated with CSI-0 410-a and CSI-1 410-b. In some cases, CSI-1 410-b may be an example of a first reference signal for a first channel measurement at the UE, and CSI-0 410-a may be an example of a prior reference signal.

In this example, a DRX cycle 415 is configured at the UE with DRX active durations and DRX inactive durations. In this case, each of the CSI-RS arrivals 405 is in a scheduled DRX inactive period of the DRX cycle, and thus the UE may skip measurement of the CSI-RSs in each instance of CRS-RS transmissions until the UE is triggered to measure a CSI-RS (e.g., based on a counter of missed CSI-RS transmissions, a value a change in one or more channel quality metrics (e.g., whether $\Delta_{RSRP}$, $\Delta_{RSRQ}$ exceed a predetermined threshold value), or any combinations thereof). In the example of FIG. 4, the CSI-RS arrivals 405 are relatively close to the end of corresponding scheduled DRX active mode durations. Thus, in this example, as indicated at 420, the UE may move to the limited active mode to measure CSI-1, and transmit a feedback report to the base station (e.g., via an uplink transmission of control information) based on the measured CSI. In some cases, the UE may turn off PDCCH decoding components, but not perform additional sleep activities (e.g., powering down one or more power amplifiers or baseband decoding components in a receive chain) until CSI-1 410 is measured, as indicated at 425. In some case, a time difference between the time 425 and a start or finish of the DRX active mode may be determined, and if it is within a predetermined time window of an end of a DRX active mode window, the UE may move to the limited active mode to make the measurement.

FIG. 5 illustrates an example of a DRX cycle with a limited active mode portion 500 that supports channel measurement techniques in discontinuous reception scenarios in accordance with aspects of the present disclosure. In some examples, DRX cycle with limited active mode portions 500 may implement aspects of wireless communications system 100 or 200. In this example, a CSI-RS configuration may provide CSI-RS arrivals 505 at periodic intervals, as indicated with CSI-0 510-a and CSI-1 510-b. In some cases, CSI-1 510-b may be an example of a first reference signal for a first channel measurement at the UE, and CSI-0 510-a may be an example of a prior reference signal.

In this example, a DRX cycle 515 is configured at the UE with DRX active durations and DRX inactive durations. In this case, each of the CSI-RS arrivals 505 is in a scheduled DRX inactive period of the DRX cycle, and thus the UE may skip measurement of the CSI-RSs in each instance of CRS-RS transmissions until the UE is triggered to measure a CSI-RS (e.g., based on a counter of missed CSI-RS transmissions, a value a change in one or more channel quality metrics (e.g., whether $\Delta_{RSRP}$, $\Delta_{RSRQ}$ exceed a predetermined threshold value), or any combinations thereof). In the example of FIG. 5, the CSI-RS arrivals 505 are within a center window between DRX active durations (e.g., within a predefined center window, such as the center ⅓rd of the inactive mode duration). Thus, in this example, as indicated at 520, the UE may transition to a sleep mode until just before time 525, transition to the limited active mode to perform the CSI measurement, and then transition back to the inactive mode. The UE may then transmit a feedback report to the base station (e.g., via an uplink transmission of control information) based on the measured CSI. In some cases, the UE may keep PDCCH decoding components turned off, but turn on other components (e.g., one or more power amplifiers or baseband decoding components in a receive chain) until CSI-1 510 is measured. In some case, a time difference between the time 525 and a start or finish of the DRX active mode may be determined, and if it is within a predetermined center window, the UE may partially and temporarily awaken to the limited active mode to make the measurement.

FIG. 6 illustrates an example of a DRX cycle with a limited active mode portion 600 that supports channel measurement techniques in discontinuous reception scenarios in accordance with aspects of the present disclosure. In some examples, DRX cycle with a limited active mode portion 600 may implement aspects of wireless communications system 100 or 200. In this example, a CSI-RS configuration may provide CSI-RS arrivals 605 at periodic intervals, as indicated with CSI-0 610-a and CSI-1 610-b. In some cases, CSI-1 610-b may be an example of a first reference signal for a first channel measurement at the UE, and CSI-0 610-a may be an example of a prior reference signal.

In this example, a DRX cycle 615 is configured at the UE with DRX active durations and DRX inactive durations. In this case, each of the CSI-RS arrivals 605 is in a scheduled DRX inactive period of the DRX cycle, and thus the UE may skip measurement of the CSI-RSs in each instance of CRS-RS transmissions until the UE is triggered to measure a CSI-RS (e.g., based on a counter of missed CSI-RS transmissions, a value a change in one or more channel quality metrics (e.g., whether $\Delta_{RSRP}$, $\Delta_{RSRQ}$ exceed a predetermined threshold value), or any combinations thereof). In the example of FIG. 6, the CSI-RS arrivals 605 are relatively close to the start time of scheduled DRX active modes (e.g., within a predefined window prior to a scheduled DRX active mode). Thus, in this example, as indicated at 620, the UE may transition to the inactive mode until just before time 625, transition to the limited active mode to perform the CSI measurement, and then to the full active mode for the subsequent scheduled DRX active mode. The UE may then transmit a feedback report to the base station (e.g., via an uplink transmission of control information) based on the measured CSI. In some cases, the UE may keep PDCCH decoding components turned off in the limited active mode, but turn on other components (e.g., one or more power amplifiers, baseband decoding components, etc., in a receive chain) until CSI-1 610 is measured. In some case, a time difference between the time 625 and a start of the DRX active mode may be determined, and if it is within a predetermined time window, the UE may partially awaken to the limited active mode to make the measurement, and then fully awaken to the active mode at the scheduled start of the DRX active mode.

Figure 7:
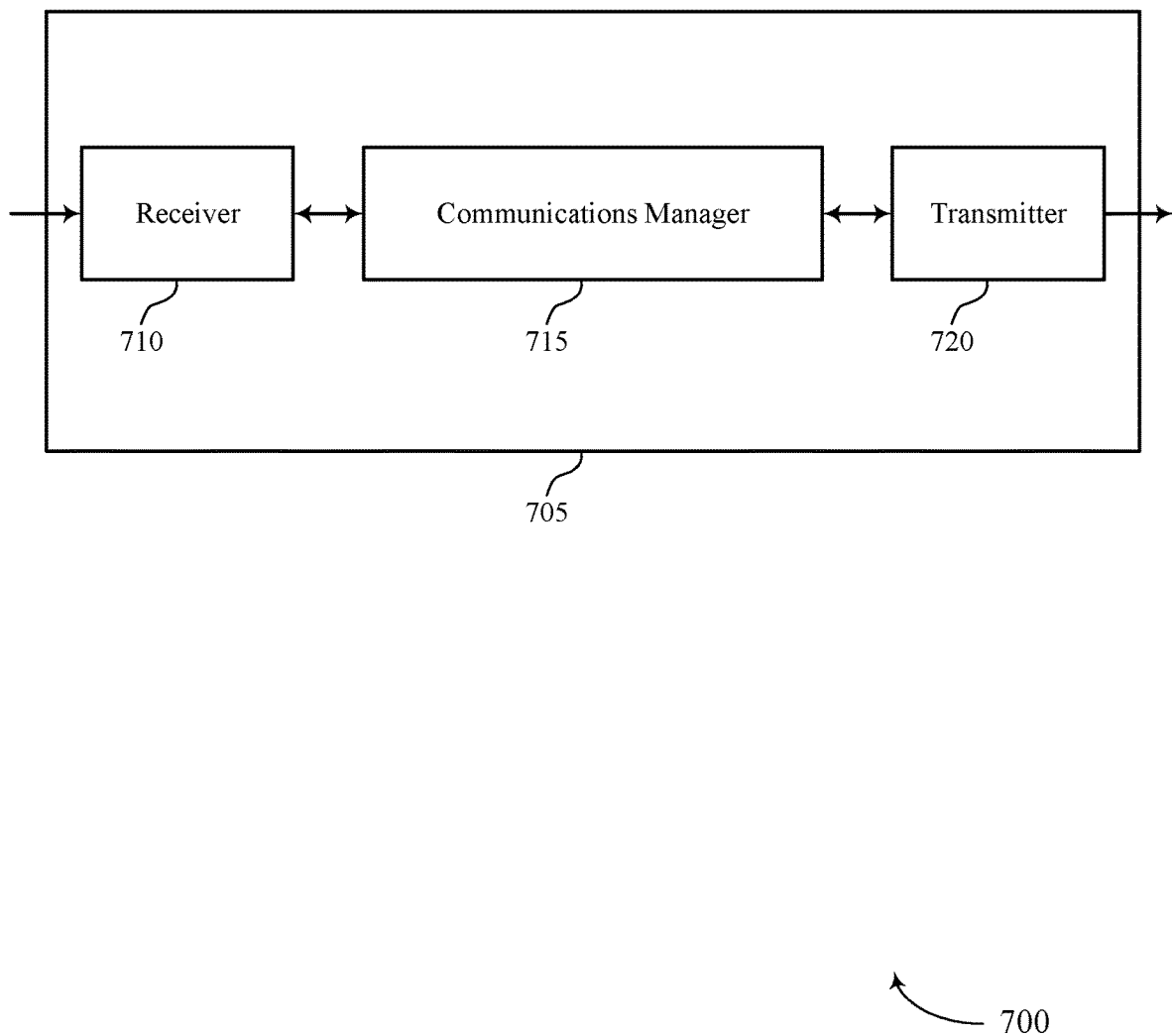
FIGS. 7 and 8 show block diagrams of devices that support channel measurement techniques in discontinuous reception scenarios in accordance with aspects of the present disclosure.

FIG. 7 shows a block diagram 700 of a device 705 that supports channel measurement techniques in discontinuous reception scenarios in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to channel measurement techniques in discontinuous reception scenarios, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive a discontinuous reception cycle configuration from a base station that indicates a set of discontinuous reception cycles within a discontinuous reception period that each have an ON-duration during which the UE is to be in an active mode to monitor for transmissions from the base station, and where the UE transitions to an inactive mode after one or more of the ON-durations until a subsequent ON-duration, identify a channel measurement schedule that indicates a timing for one or more channel measurements of the UE, where at least a first channel measurement occurs when the UE is to be in the inactive mode of the discontinuous reception cycle configuration, determine that a change in a channel quality metric exceeds a threshold value during a predetermined period before the first channel measurement, and set the UE to be in a limited active mode to perform the first scheduled channel measurement based on the determining that the change in the channel quality metric exceeds the threshold value for at least the predetermined period before the first channel measurement. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
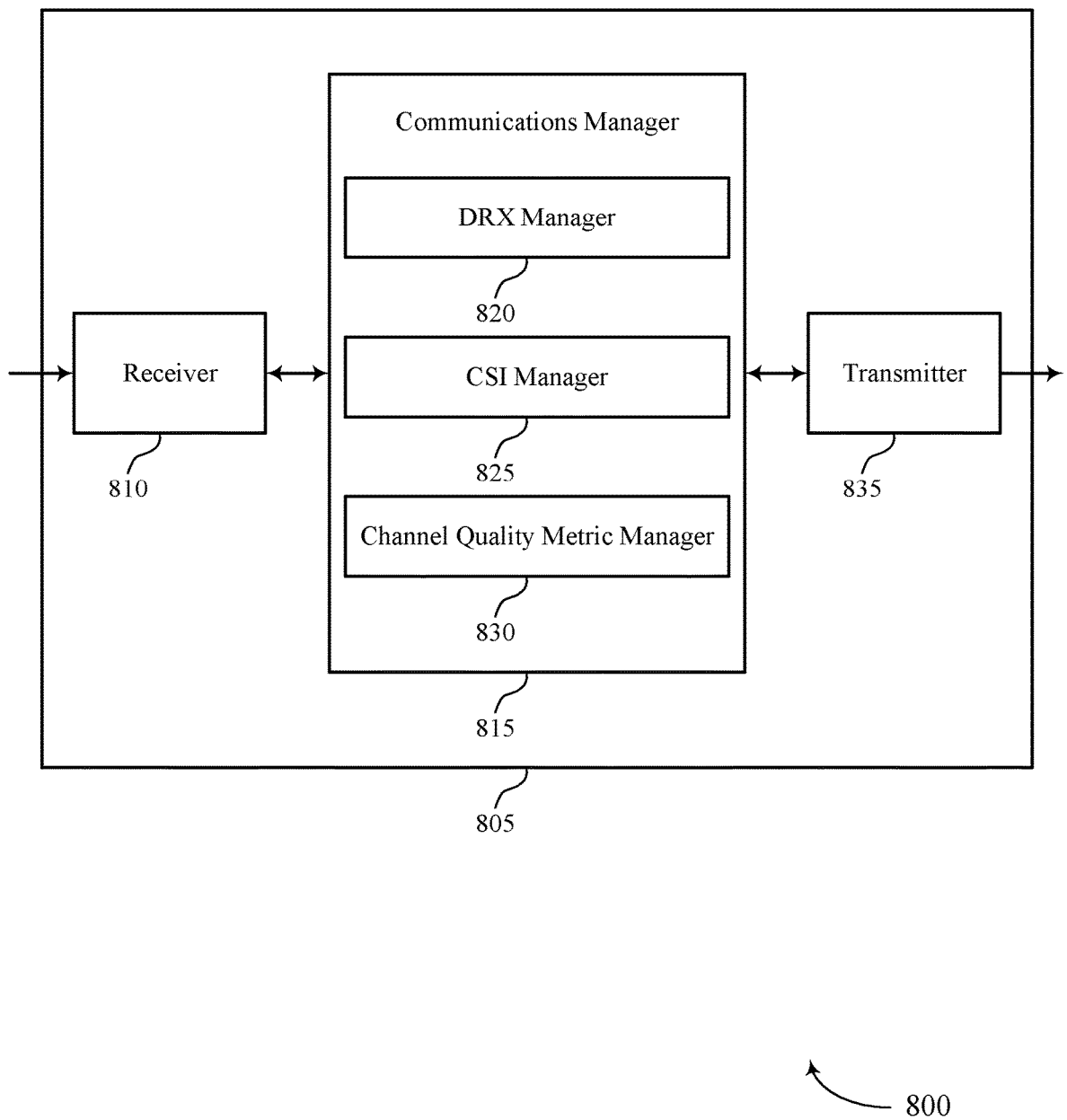

FIG. 8 shows a block diagram 800 of a device 805 that supports channel measurement techniques in discontinuous reception scenarios in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to channel measurement techniques in discontinuous reception scenarios, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a DRX manager 820, a CSI manager 825, and a channel quality metric manager 830. The communications manager 815 may be an example of aspects of the communications manager 1010 described herein.

The DRX manager 820 may receive a discontinuous reception cycle configuration from a base station that indicates a set of discontinuous reception cycles within a discontinuous reception period that each have an ON-duration during which the UE is to be in an active mode to monitor for transmissions from the base station, and where the UE transitions to an inactive mode after one or more of the ON-durations until a subsequent ON-duration. The DRX manager 820 also may set the UE to be in the limited active mode to perform the first scheduled channel measurement based on the determining that the change in the channel quality metric exceeds the threshold value for at least the predetermined period before the first channel measurement.

The CSI manager 825 may identify a channel measurement schedule that indicates a timing for one or more channel measurements of the UE, where at least a first channel measurement occurs when the UE is to be in the inactive mode of the discontinuous reception cycle configuration.

The channel quality metric manager 830 may determine that a change in a channel quality metric exceeds a threshold value during a predetermined period before the first channel measurement.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
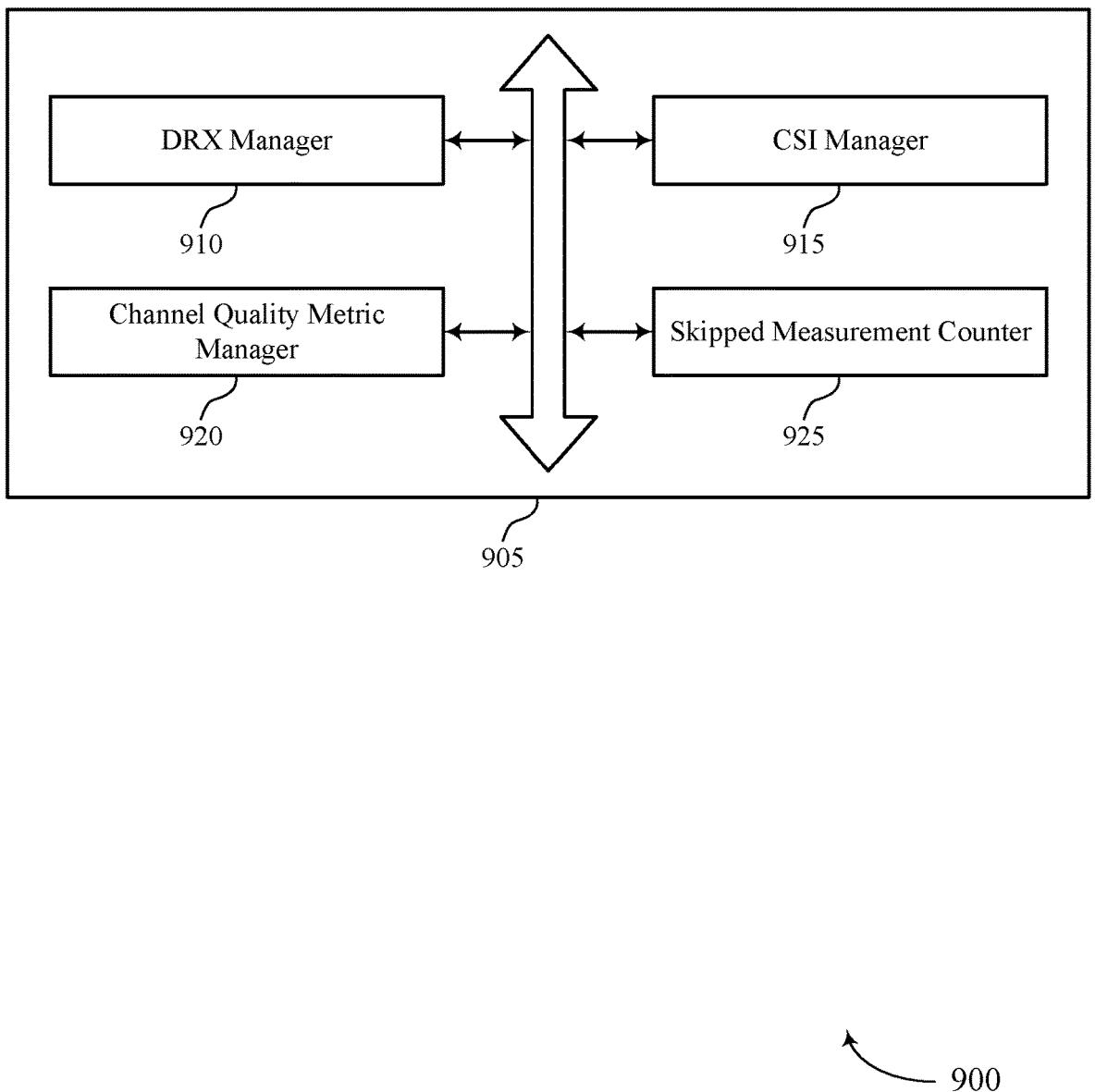
FIG. 9 shows a block diagram of a communications manager that supports channel measurement techniques in discontinuous reception scenarios in accordance with aspects of the present disclosure.

FIG. 9 shows a block diagram 900 of a communications manager 905 that supports channel measurement techniques in discontinuous reception scenarios in accordance with aspects of the present disclosure. The communications manager 905 may be an example of aspects of a communications manager 715, a communications manager 815, or a communications manager 1010 described herein. The communications manager 905 may include a DRX manager 910, a CSI manager 915, a channel quality metric manager 920, and a skipped measurement counter 925. Each of these modules may communicate, directly or indirectly, with one another (e.g., via one or more buses).

The DRX manager 910 may receive a discontinuous reception cycle configuration from a base station that indicates a set of discontinuous reception cycles within a discontinuous reception period that each have an ON-duration during which the UE is to be in an active mode to monitor for transmissions from the base station, and where the UE transitions to an inactive mode after one or more of the ON-durations until a subsequent ON-duration. In some examples, the DRX manager 910 may set the UE to be in the limited active mode to perform the first scheduled channel measurement based on the determining that the change in the channel quality metric exceeds the threshold value for at least the predetermined period before the first channel measurement. In some examples, the DRX manager 910 may skip at least one prior channel measurement prior to the first channel measurement based on the UE being in the inactive mode of the discontinuous reception cycle at a corresponding time of the at least one prior channel measurement, and where the predetermined period corresponds to a predetermined number of skipped prior channel measurements.

In some examples, the DRX manager 910 may maintain channel measurement components (e.g., one or more power amplifiers, reference signal sequence detection components, channel estimation components, etc.) of the UE in an ON state and deactivate PDCCH decoding components (e.g., de-mapping components, de-interleaving components, digital Fourier transform (DFT) components, baseband decoding components, etc.) following an ON-duration of the discontinuous reception cycle that is prior to the first channel measurement. In some examples, the DRX manager 910 may deactivate, responsive to performing the first channel measurement, the channel measurement components.

In some examples, the DRX manager 910 may transition channel measurement components and PDCCH decoding components of the UE to an inactive state following an ON-duration of the discontinuous reception cycle that is prior to the first channel measurement. In some examples, the DRX manager 910 may transition the channel measurement components to an ON state based on the channel measurement schedule associated with the first channel measurement. In some examples, the DRX manager 910 may transition the PDCCH decoding components to the ON state for a subsequent ON-duration. In some cases, the predetermined period is based on a preconfigured time duration. In some cases, a duration of the predetermined period is based on a magnitude of the change in the channel quality metric. In some cases, a duration of the predetermined period is longer for a smaller magnitude of change in the channel quality metric, and is shorter for a larger magnitude of change in the channel quality metric. In some cases, the channel measurement components are maintained in the ON state after expiration of the ON-duration based on the scheduled CSI measurement being within a predetermined time from the expiration of the ON-duration.

In some cases, the channel measurement components are transitioned to the ON state after expiration of the ON-duration based on the scheduled CSI measurement being between a predetermined time from the expiration of the ON-duration and from a start of a subsequent ON-duration.

In some cases, the channel measurement components are transitioned to the ON state prior to the subsequent ON-duration based on the scheduled CSI measurement being within a predetermined time from a start of the subsequent ON-duration.

The CSI manager 915 may identify a channel measurement schedule that indicates a timing for one or more channel measurements of the UE, where at least a first channel measurement occurs when the UE is to be in the inactive mode of the discontinuous reception cycle configuration. In some examples, the CSI manager 915 may perform the first scheduled channel measurement. In some examples, the CSI manager 915 may reset the counter of skipped channel measurements to an initial value responsive to the performing the first scheduled channel measurement.

The channel quality metric manager 920 may determine that a change in a channel quality metric exceeds a threshold value during a predetermined period before the first channel measurement. In some examples, the channel quality metric manager 920 may compare a current value of the channel quality metric to a prior value of the channel quality metric prior to transitioning to the inactive mode. In some examples, the channel quality metric manager 920 may store, after the comparing, the current value of the channel quality metric to replace the prior value of the channel quality metric.

In some examples, the channel quality metric manager 920 may determine that at least a predetermined number of prior channel measurements have been skipped based on the UE being in the inactive mode during corresponding scheduled channel measurements of the channel measurement schedule, where the predetermined period corresponds to the predetermined number of prior channel measurements.

In some examples, the channel quality metric manager 920 may determine that a difference between a current channel quality metric and a prior channel quality metric exceeds the threshold value. In some cases, the channel quality metric includes one or more of a reference signal received power (RSRP), a reference signal received quality (RSRQ), or a signal to noise ratio (SNR), or any combinations thereof, that is determined based on one or more signals received from the base station.

The skipped measurement counter 925 may update a counter of skipped channel measurements upon each occurrence of skipping a channel measurement. In some examples, the skipped measurement counter 925 may compare a value of the counter to the predetermined number of skipped prior channel measurements to determine to maintain the UE in the limited active mode to perform the first scheduled channel measurement. In some cases, the counter of skipped channel measurements is updated when the UE transitions from the inactive mode to the active mode of the discontinuous reception cycle.

Figure 10:
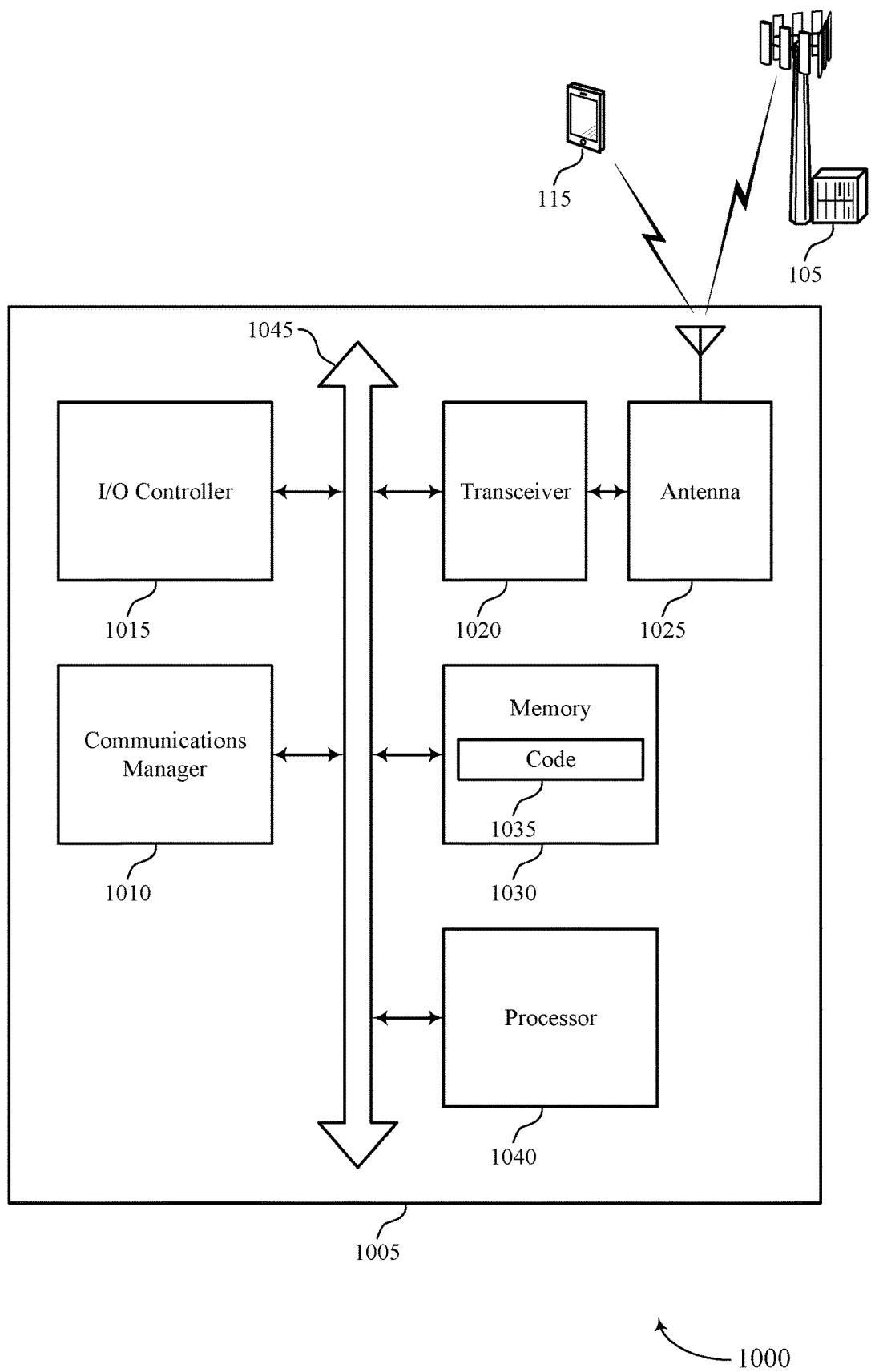
FIG. 10 shows a diagram of a system including a device that supports channel measurement techniques in discontinuous reception scenarios in accordance with aspects of the present disclosure.

FIG. 10 shows a diagram of a system 1000 including a device 1005 that supports channel measurement techniques in discontinuous reception scenarios in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive a discontinuous reception cycle configuration from a base station that indicates a set of discontinuous reception cycles within a discontinuous reception period that each have an ON-duration during which the UE is to be in an active mode to monitor for transmissions from the base station, and where the UE transitions to an inactive mode after one or more of the ON-durations until a subsequent ON-duration, identify a channel measurement schedule that indicates a timing for one or more channel measurements of the UE, where at least a first channel measurement occurs when the UE is to be in the inactive mode of the discontinuous reception cycle configuration, determine that a change in a channel quality metric exceeds a threshold value during a predetermined period before the first channel measurement, and set the UE to be in the limited active mode to perform the first scheduled channel measurement based on the determining that the change in the channel quality metric exceeds the threshold value for at least the predetermined period before the first channel measurement.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting channel measurement techniques in discontinuous reception scenarios).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
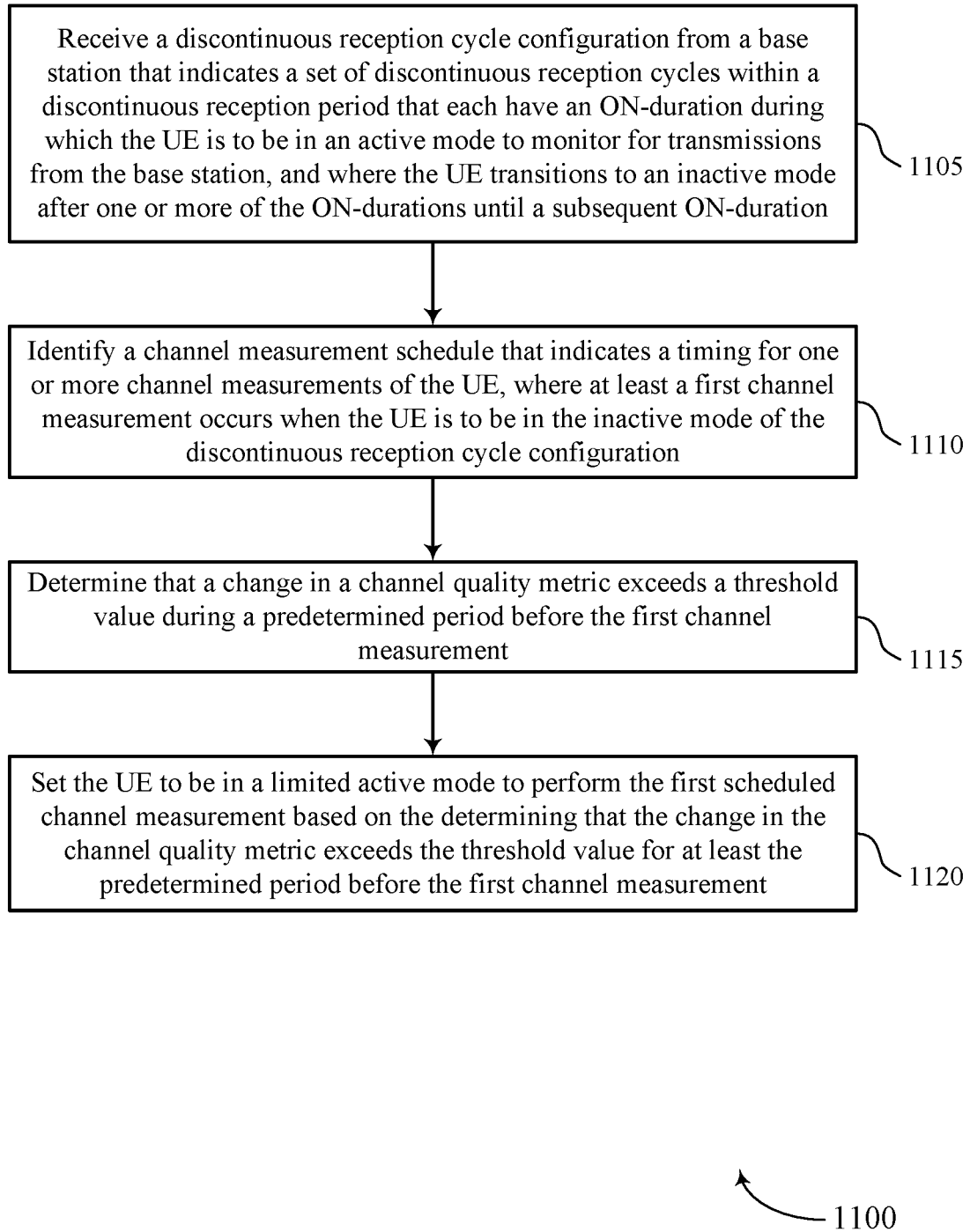
FIGS. 11 through 14 show flowcharts illustrating methods that support channel measurement techniques in discontinuous reception scenarios in accordance with aspects of the present disclosure.

FIG. 11 shows a flowchart illustrating a method 1100 that supports channel measurement techniques in discontinuous reception scenarios in accordance with aspects of the present disclosure. The operations of method 1100 may be implemented by a UE 115 or its components as described herein. For example, the operations of method 1100 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1105, the UE may receive a discontinuous reception cycle configuration from a base station that indicates a set of discontinuous reception cycles within a discontinuous reception period that each have an ON-duration during which the UE is to be in an active mode to monitor for transmissions from the base station, and where the UE transitions to an inactive mode after one or more of the ON-durations until a subsequent ON-duration. The operations of 1105 may be performed according to the methods described herein. In some examples, aspects of the operations of 1105 may be performed by a DRX manager as described with reference to FIGS. 7 through 10.

At 1110, the UE may identify a channel measurement schedule that indicates a timing for one or more channel measurements of the UE, where at least a first channel measurement occurs when the UE is to be in the inactive mode of the discontinuous reception cycle configuration. The operations of 1110 may be performed according to the methods described herein. In some examples, aspects of the operations of 1110 may be performed by a CSI manager as described with reference to FIGS. 7 through 10.

At 1115, the UE may determine that a change in a channel quality metric exceeds a threshold value during a predetermined period before the first channel measurement. The operations of 1115 may be performed according to the methods described herein. In some examples, aspects of the operations of 1115 may be performed by a channel quality metric manager as described with reference to FIGS. 7 through 10.

At 1120, the UE may be set to be in the limited active mode to perform the first scheduled channel measurement based on the determining that the change in the channel quality metric exceeds the threshold value for at least the predetermined period before the first channel measurement. The operations of 1120 may be performed according to the methods described herein. In some examples, aspects of the operations of 1120 may be performed by a DRX manager as described with reference to FIGS. 7 through 10.

Figure 12:
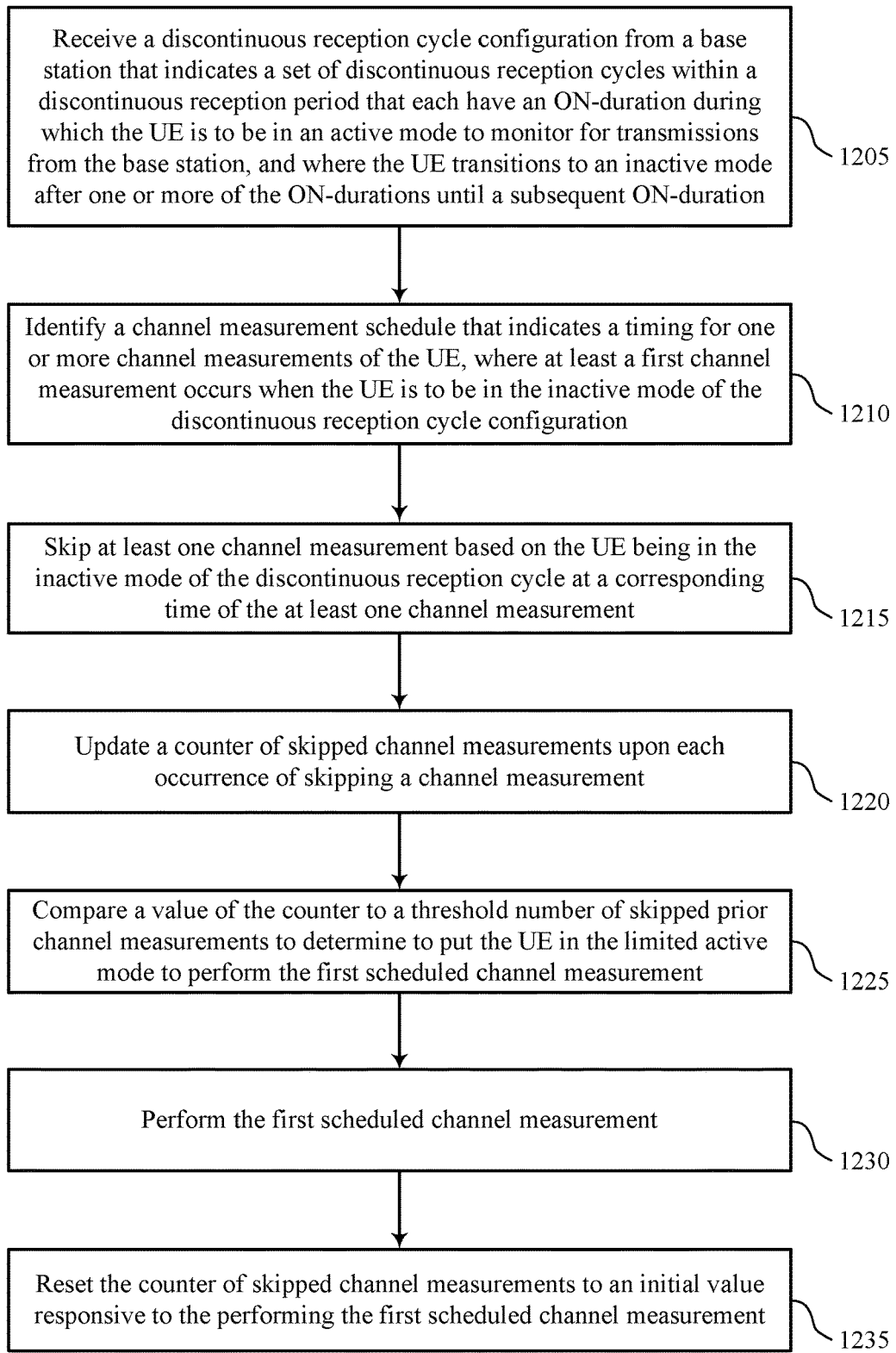

FIG. 12 shows a flowchart illustrating a method 1200 that supports channel measurement techniques in discontinuous reception scenarios in accordance with aspects of the present disclosure. The operations of method 1200 may be implemented by a UE 115 or its components as described herein. For example, the operations of method 1200 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1205, the UE may receive a discontinuous reception cycle configuration from a base station that indicates a set of discontinuous reception cycles within a discontinuous reception period that each have an ON-duration during which the UE is to be in an active mode to monitor for transmissions from the base station, and where the UE transitions to an inactive mode after one or more of the ON-durations until a subsequent ON-duration. The operations of 1205 may be performed according to the methods described herein. In some examples, aspects of the operations of 1205 may be performed by a DRX manager as described with reference to FIGS. 7 through 10.

At 1210, the UE may identify a channel measurement schedule that indicates a timing for one or more channel measurements of the UE, where at least a first channel measurement occurs when the UE is to be in the inactive mode of the discontinuous reception cycle configuration. The operations of 1210 may be performed according to the methods described herein. In some examples, aspects of the operations of 1210 may be performed by a CSI manager as described with reference to FIGS. 7 through 10.

At 1215, the UE may skip at least one channel measurement based on the UE being in the inactive mode of the discontinuous reception cycle at a corresponding time of the at least one prior channel measurement, and where the predetermined period corresponds to a predetermined number of skipped prior channel measurements. The operations of 1215 may be performed according to the methods described herein. In some examples, aspects of the operations of 1215 may be performed by a DRX manager as described with reference to FIGS. 7 through 10.

At 1220, the UE may update a counter of skipped channel measurements upon each occurrence of skipping a channel measurement. The operations of 1220 may be performed according to the methods described herein. In some examples, aspects of the operations of 1220 may be performed by a skipped measurement counter as described with reference to FIGS. 7 through 10.

At 1225, the UE may compare a value of the counter to a threshold number of skipped prior channel measurements to determine to put the UE in the limited active mode to perform the first scheduled channel measurement. The operations of 1225 may be performed according to the methods described herein. In some examples, aspects of the operations of 1225 may be performed by a skipped measurement counter as described with reference to FIGS. 7 through 10.

At 1230, the UE may perform the first scheduled channel measurement. The operations of 1230 may be performed according to the methods described herein. In some examples, aspects of the operations of 1230 may be performed by a CSI manager as described with reference to FIGS. 7 through 10.

At 1235, the UE may reset the counter of skipped channel measurements to an initial value responsive to the performing the first scheduled channel measurement. The operations of 1235 may be performed according to the methods described herein. In some examples, aspects of the operations of 1235 may be performed by a CSI manager as described with reference to FIGS. 7 through 10.

Figure 13:
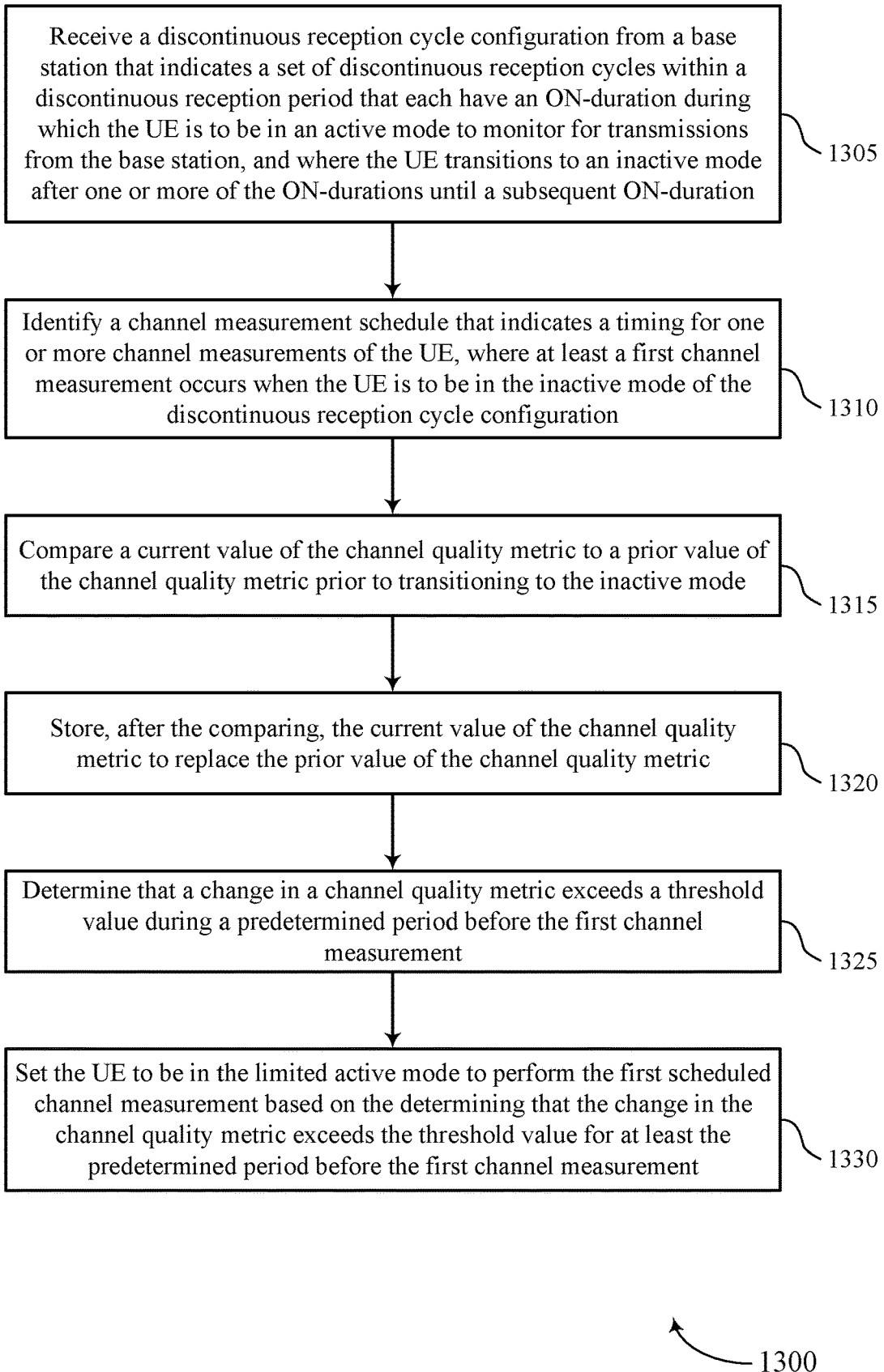

FIG. 13 shows a flowchart illustrating a method 1300 that supports channel measurement techniques in discontinuous reception scenarios in accordance with aspects of the present disclosure. The operations of method 1300 may be implemented by a UE 115 or its components as described herein. For example, the operations of method 1300 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1305, the UE may receive a discontinuous reception cycle configuration from a base station that indicates a set of discontinuous reception cycles within a discontinuous reception period that each have an ON-duration during which the UE is to be in an active mode to monitor for transmissions from the base station, and where the UE transitions to an inactive mode after one or more of the ON-durations until a subsequent ON-duration. The operations of 1305 may be performed according to the methods described herein. In some examples, aspects of the operations of 1305 may be performed by a DRX manager as described with reference to FIGS. 7 through 10.

At 1310, the UE may identify a channel measurement schedule that indicates a timing for one or more channel measurements of the UE, where at least a first channel measurement occurs when the UE is to be in the inactive mode of the discontinuous reception cycle configuration. The operations of 1310 may be performed according to the methods described herein. In some examples, aspects of the operations of 1310 may be performed by a CSI manager as described with reference to FIGS. 7 through 10.

At 1315, the UE may compare a current value of the channel quality metric to a prior value of the channel quality metric prior to transitioning to the inactive mode. The operations of 1315 may be performed according to the methods described herein. In some examples, aspects of the operations of 1315 may be performed by a channel quality metric manager as described with reference to FIGS. 7 through 10.

At 1320, the UE may store, after the comparing, the current value of the channel quality metric to replace the prior value of the channel quality metric. The operations of 1320 may be performed according to the methods described herein. In some examples, aspects of the operations of 1320 may be performed by a channel quality metric manager as described with reference to FIGS. 7 through 10.

At 1325, the UE may determine that a change in a channel quality metric exceeds a threshold value during a predetermined period before the first channel measurement. The operations of 1325 may be performed according to the methods described herein. In some examples, aspects of the operations of 1325 may be performed by a channel quality metric manager as described with reference to FIGS. 7 through 10.

At 1330, the UE may be set to be in the limited active mode to perform the first scheduled channel measurement based on the determining that the change in the channel quality metric exceeds the threshold value for at least the predetermined period before the first channel measurement. The operations of 1330 may be performed according to the methods described herein. In some examples, aspects of the operations of 1330 may be performed by a DRX manager as described with reference to FIGS. 7 through 10.

Figure 14:
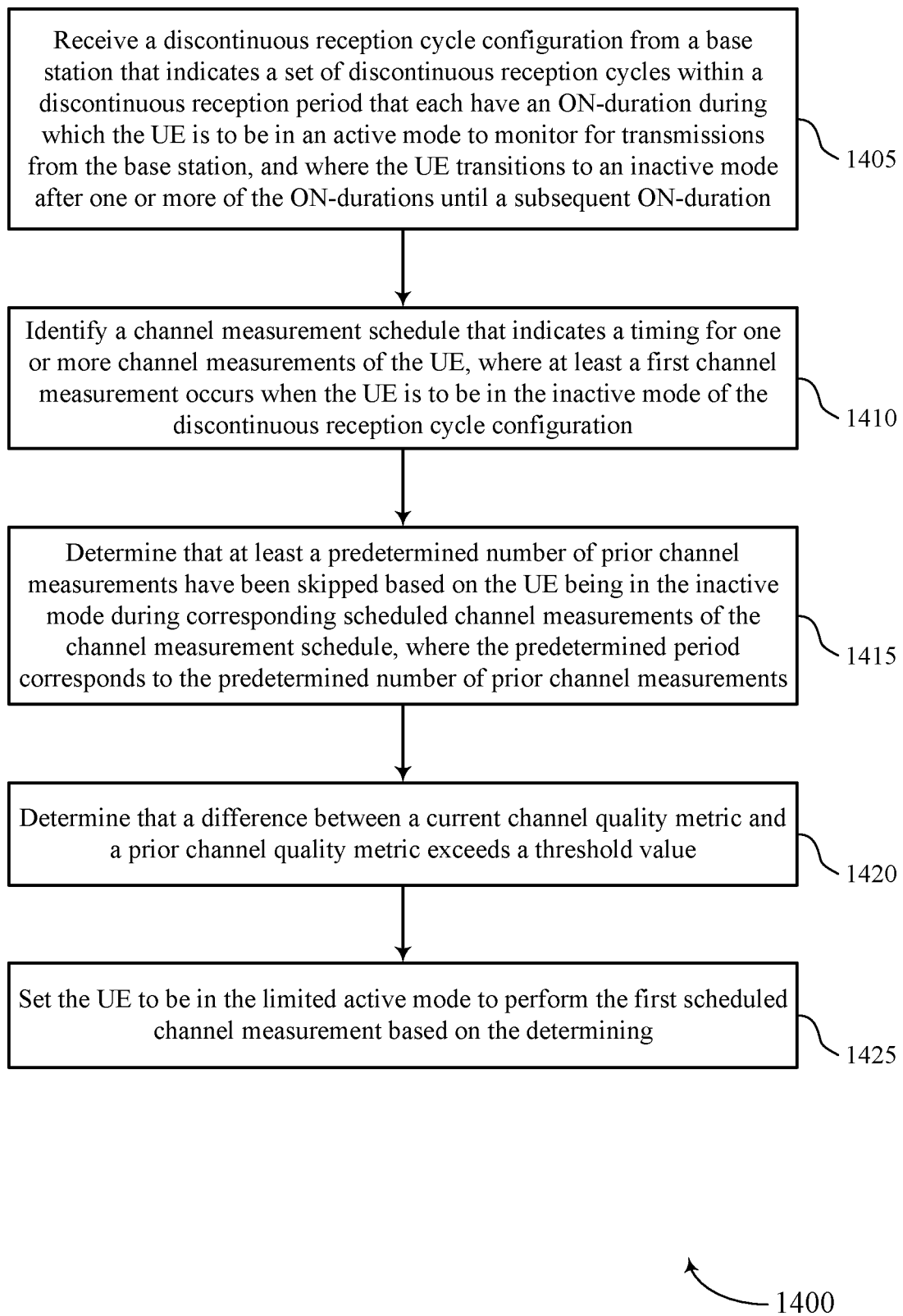

FIG. 14 shows a flowchart illustrating a method 1400 that supports channel measurement techniques in discontinuous reception scenarios in accordance with aspects of the present disclosure. The operations of method 1400 may be implemented by a UE 115 or its components as described herein. For example, the operations of method 1400 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1405, the UE may receive a discontinuous reception cycle configuration from a base station that indicates a set of discontinuous reception cycles within a discontinuous reception period that each have an ON-duration during which the UE is to be in an active mode to monitor for transmissions from the base station, and where the UE transitions to an inactive mode after one or more of the ON-durations until a subsequent ON-duration. The operations of 1405 may be performed according to the methods described herein. In some examples, aspects of the operations of 1405 may be performed by a DRX manager as described with reference to FIGS. 7 through 10.

At 1410, the UE may identify a channel measurement schedule that indicates a timing for one or more channel measurements of the UE, where at least a first channel measurement occurs when the UE is to be in the inactive mode of the discontinuous reception cycle configuration. The operations of 1410 may be performed according to the methods described herein. In some examples, aspects of the operations of 1410 may be performed by a CSI manager as described with reference to FIGS. 7 through 10.

At 1415, the UE may determine that at least a predetermined number of prior channel measurements have been skipped based on the UE being in the inactive mode during corresponding scheduled channel measurements of the channel measurement schedule, where the predetermined period corresponds to the predetermined number of prior channel measurements. The operations of 1415 may be performed according to the methods described herein. In some examples, aspects of the operations of 1415 may be performed by a channel quality metric manager as described with reference to FIGS. 7 through 10.

At 1420, the UE may determine that a difference between a current channel quality metric and a prior channel quality metric exceeds a threshold value. The operations of 1420 may be performed according to the methods described herein. In some examples, aspects of the operations of 1420 may be performed by a channel quality metric manager as described with reference to FIGS. 7 through 10.

At 1425, the UE may be set to be in the limited active mode to perform the first scheduled channel measurement based on the determining. The operations of 1425 may be performed according to the methods described herein. In some examples, aspects of the operations of 1425 may be performed by a DRX manager as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving a discontinuous reception cycle configuration that indicates a plurality of discontinuous reception cycles within a discontinuous reception period that each have an ON-duration during which the UE is to be in an active mode to monitor for transmissions from an access network entity, and wherein the UE transitions to an inactive mode after one or more of the ON-durations until a subsequent ON-duration, and at least a first channel measurement associated with a channel measurement schedule occurs when the UE is to be in the inactive mode of the discontinuous reception cycle configuration;
    skipping at least one channel measurement prior to the first channel measurement based at least in part on the UE being in the inactive mode of the discontinuous reception cycle at a corresponding time of the at least one prior channel measurement; and
    setting the UE to be in a limited active mode to perform the first channel measurement based at least in part on a change in a channel quality metric exceeding a threshold value for at least a predetermined period before the first channel measurement, the predetermined period including at least one skipped channel measurement.

2. The method of claim 1, wherein:
    the predetermined period corresponds to a predetermined quantity of skipped channel measurements.

3. The method of claim 2, further comprising:
    updating a counter of skipped channel measurements upon each occurrence of skipping a channel measurement; and
    comparing a value of the counter to the predetermined quantity of skipped prior channel measurements to determine to maintain the UE in the limited active mode to perform the first channel measurement.

4. The method of claim 3, wherein the counter of skipped channel measurements is updated when the UE transitions from the inactive mode to the active mode of the discontinuous reception cycle.

5. The method of claim 3, further comprising:
    performing the first channel measurement; and
    resetting the counter of skipped channel measurements to an initial value responsive to the performing the first channel measurement.

6. The method of claim 1, wherein the predetermined period is based on one or more of a preconfigured time duration, a magnitude of the change in the channel quality metric, or any combinations thereof.

7. The method of claim 6, wherein a duration of the predetermined period is longer for a smaller magnitude of change in the channel quality metric, and is shorter for a larger magnitude of change in the channel quality metric.

8. The method of claim 1, wherein the channel quality metric comprises one or more of a reference signal received power (RSRP), a reference signal received quality (RSRQ), or a signal to noise ratio (SNR), or any combinations thereof, that is determined based at least in part on one or more signals received from the access network entity.

9. The method of claim 1, further comprising:
    comparing a current value of the channel quality metric to a prior value of the channel quality metric prior to transitioning to the inactive mode.

10. The method of claim 9, further comprising:
    storing, after the comparing, the current value of the channel quality metric to replace the prior value of the channel quality metric.

11. The method of claim 1, wherein the setting the UE to be in a limited active mode to perform the first channel measurement further comprises:
    determining that at least a predetermined number of prior channel measurements have been skipped based on the UE being in the inactive mode during corresponding scheduled channel measurements of the channel measurement schedule, wherein the predetermined period corresponds to the predetermined number of prior channel measurements; and
    determining that a difference between a current channel quality metric and a prior channel quality metric exceeds the threshold value.

12. The method of claim 1, wherein the setting the UE to be in the limited active mode further comprises:
    maintaining channel measurement components of the UE in an ON state and deactivating physical downlink control channel (PDCCH) decoding components following an ON-duration of a discontinuous reception cycle that is prior to the first channel measurement;

performing the first channel measurement; and
deactivating, responsive to performing the first channel measurement, the channel measurement components.

13. The method of claim 12, wherein the channel measurement components are maintained in the ON state after expiration of the ON-duration based on the first channel measurement being within a predetermined time from the expiration of the ON-duration.

14. The method of claim 1, wherein the setting the UE to be in the limited active mode further comprises:
transitioning channel measurement components and physical downlink control channel (PDCCH) decoding components of the UE to an inactive state following an ON-duration of a discontinuous reception cycle that is prior to the first channel measurement;
transitioning the channel measurement components to an ON state based at least in part on the channel measurement schedule associated with the first channel measurement;
performing the first channel measurement; and
deactivating, responsive to performing the first channel measurement, the channel measurement components.

15. The method of claim 14, wherein the channel measurement components are transitioned to the ON state after expiration of the ON-duration based on the first channel measurement being between a predetermined time from the expiration of the ON-duration and from a start of a subsequent ON-duration.

16. The method of claim 1, wherein the setting the UE to be in the limited active mode further comprises:
transitioning channel measurement components and physical downlink control channel (PDCCH) decoding components of the UE to an inactive state following an ON-duration of a discontinuous reception cycle that is prior to the first channel measurement;
transitioning the channel measurement components to an ON state based at least in part on the channel measurement schedule associated with the first channel measurement;
performing the first channel measurement; and
transitioning the PDCCH decoding components to the ON state for a subsequent ON-duration.

17. The method of claim 16, wherein the channel measurement components are transitioned to the ON state prior to the subsequent ON-duration based on the first channel measurement being within a predetermined time from a start of the subsequent ON-duration.

18. An apparatus for wireless communications at a user equipment (UE), comprising:
a processor,
memory coupled with the processor; and
instructions stored in the memory and executable by the processor to cause the apparatus to:
receive a discontinuous reception cycle configuration that indicates a plurality of discontinuous reception cycles within a discontinuous reception period that each have an ON-duration during which the UE is to be in an active mode to monitor for transmissions from an access network entity, and wherein the UE transitions to an inactive mode after one or more of the ON-durations until a subsequent ON-duration, and at least a first channel measurement associated with a channel measurement schedule occurs when the UE is to be in the inactive mode of the discontinuous reception cycle configuration;
skip at least one channel measurement prior to the first channel measurement based at least in part on the UE being in the inactive mode of the discontinuous reception cycle at a corresponding time of the at least one prior channel measurement; and
set the UE to be in a limited active mode to perform the first channel measurement based at least in part on a change in a channel quality metric exceeding a threshold value for at least a predetermined period before the first channel measurement, the predetermined period including at least one skipped channel measurement.

19. The apparatus of claim 18, wherein
the predetermined period corresponds to a predetermined number of skipped prior channel measurements, and wherein the instructions are further executable by the processor to cause the apparatus to:
update a counter of skipped channel measurements upon each occurrence of skipping a channel measurement; and
compare a value of the counter to the predetermined number of skipped prior channel measurements to determine to maintain the UE in the active mode to perform the first channel measurement.

20. The apparatus of claim 19, wherein the instructions are further executable by the processor to cause the apparatus to:
perform the first channel measurement; and
reset the counter of skipped channel measurements to an initial value responsive to the performing the first channel measurement.

21. The apparatus of claim 18, wherein the predetermined period is based on one or more of a preconfigured time duration, a magnitude of the change in the channel quality metric, or any combinations thereof.

22. The apparatus of claim 18, wherein the instructions are further executable by the processor to cause the apparatus to:
compare a current value of the channel quality metric to a prior value of the channel quality metric prior to transitioning to the inactive mode; and
store, after the comparing, the current value of the channel quality metric to replace the prior value of the channel quality metric.

23. The apparatus of claim 18, wherein the instructions are further executable by the processor to cause the apparatus to:
determine that at least a predetermined number of prior channel measurements have been skipped based on the UE being in the inactive mode during corresponding scheduled channel measurements of the channel measurement schedule, wherein the predetermined period corresponds to the predetermined number of prior channel measurements; and
determine that a difference between a current channel quality metric and a prior channel quality metric exceeds the threshold value.

24. The apparatus of claim 18, wherein the instructions are further executable by the processor to cause the apparatus to:
maintain channel measurement components of the UE in an ON state and deactivating physical downlink control channel (PDCCH) decoding components following an ON-duration of a discontinuous reception cycle that is prior to the first channel measurement;
perform the first channel measurement; and
deactivate, responsive to performing the first channel measurement, the channel measurement components.

25. The apparatus of claim 18, wherein the instructions are further executable by the processor to cause the apparatus to:
  transition channel measurement components and physical downlink control channel (PDCCH) decoding components of the UE to an inactive state following an ON-duration of a discontinuous reception cycle that is prior to the first channel measurement;
  transition the channel measurement components to an ON state based at least in part on the channel measurement schedule associated with the first channel measurement;
  perform the first channel measurement; and
  deactivate, responsive to performing the first channel measurement, the channel measurement components.

26. The apparatus of claim 18, wherein the instructions are further executable by the processor to cause the apparatus to:
  transition channel measurement components and physical downlink control channel (PDCCH) decoding components of the UE to an inactive state following an ON-duration of a discontinuous reception cycle that is prior to the first channel measurement;
  transition the channel measurement components to an ON state based at least in part on the channel measurement schedule associated with the first channel measurement;
  perform the first channel measurement; and
  transition the PDCCH decoding components to the ON state for a subsequent ON-duration.

27. An apparatus for wireless communications at a user equipment (UE), comprising:
  means for receiving a discontinuous reception cycle configuration that indicates a plurality of discontinuous reception cycles within a discontinuous reception period that each have an ON-duration during which the UE is to be in an active mode to monitor for transmissions from an access network entity, and wherein the UE transitions to an inactive mode after one or more of the ON-durations until a subsequent ON-duration, and at least a first channel measurement associated with a channel measurement schedule occurs when the UE is to be in the inactive mode of the discontinuous reception cycle configuration;
  means for skipping at least one channel measurement prior to the first channel measurement based at least in part on the UE being in the inactive mode of the discontinuous reception cycle at a corresponding time of the at least one prior channel measurement; and
  means for setting the UE to be in a limited active mode to perform the first channel measurement based at least in part on a change in a channel quality metric exceeding a threshold value for at least a predetermined period before the first channel measurement, the predetermined period including at least one skipped channel measurement.

28. The apparatus of claim 27, further comprising:
  means for determining that at least a predetermined number of prior channel measurements have been skipped based on the UE being in the inactive mode during corresponding scheduled channel measurements of the channel measurement schedule, wherein the predetermined period corresponds to the predetermined number of prior channel measurements; and
  means for determining that a difference between a current channel quality metric and a prior channel quality metric exceeds the threshold value.

29. A non-transitory computer-readable medium storing code for wireless communications at a user equipment (UE), the code comprising instructions executable by a processor to:
  receive a discontinuous reception cycle configuration that indicates a plurality of discontinuous reception cycles within a discontinuous reception period that each have an ON-duration during which the UE is to be in an active mode to monitor for transmissions from an access network entity, and wherein the UE transitions to an inactive mode after one or more of the ON-durations until a subsequent ON-duration, and at least a first channel measurement associated with a channel measurement schedule occurs when the UE is to be in the inactive mode of the discontinuous reception cycle configuration;
  skip at least one channel measurement prior to the first channel measurement based at least in part on the UE being in the inactive mode of the discontinuous reception cycle at a corresponding time of the at least one prior channel measurement; and
  set the UE to be in a limited active mode to perform the first channel measurement based at least in part on a change in a channel quality metric exceeding a threshold value for at least a predetermined period before the first channel measurement, the predetermined period including at least one skipped channel measurement.

30. The non-transitory computer-readable medium of claim 29, wherein the instructions are further executable by the processor to:
  determine that at least a predetermined number of prior channel measurements have been skipped based on the UE being in the inactive mode during corresponding scheduled channel measurements of the channel measurement schedule, wherein the predetermined period corresponds to the predetermined number of prior channel measurements; and
  determine that a difference between a current channel quality metric and a prior channel quality metric exceeds the threshold value.

* * * * *